United States Patent
Yokoyama et al.

(10) Patent No.: US 8,261,291 B2
(45) Date of Patent: Sep. 4, 2012

(54) NETWORK APPARATUS, TERMINAL APPARATUS, PROGRAM, AND RECORDING MEDIUM

(75) Inventors: Akira Yokoyama, Kanagawa (JP); Osamu Suzuki, Kanagawa (JP); Eijiro Inoue, Kanagawa (JP); Du Xiaojun, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1170 days.

(21) Appl. No.: 11/774,797

(22) Filed: Jul. 9, 2007

(65) Prior Publication Data

US 2008/0016518 A1 Jan. 17, 2008

(30) Foreign Application Priority Data

Jul. 12, 2006 (JP) ................. 2006-191986

(51) Int. Cl.
*G06F 3/00* (2006.01)
*G06F 17/00* (2006.01)

(52) U.S. Cl. ...................... 719/320; 715/209
(58) Field of Classification Search ............ 719/321, 719/310, 320; 707/120; 715/209
See application file for complete search history.

(56) References Cited

U.S. PATENT DOCUMENTS

| | | | | |
|---|---|---|---|---|
| 5,079,638 A * | 1/1992 | Kishi et al. | ...... | 358/448 |
| 5,621,662 A * | 4/1997 | Humphries et al. | ...... | 700/276 |
| 5,963,952 A * | 10/1999 | Smith | ...... | 1/1 |
| 6,643,028 B1 * | 11/2003 | Ogura et al. | ...... | 358/1.6 |
| 7,091,853 B2 * | 8/2006 | Pfleging et al. | ...... | 340/539.16 |
| 7,254,816 B2 * | 8/2007 | Rosenbloom et al. | ...... | 719/327 |
| 7,274,303 B2 * | 9/2007 | Dresti et al. | ...... | 340/12.3 |
| 7,886,033 B2 * | 2/2011 | Hopmann et al. | ...... | 709/223 |
| 2001/0014908 A1 | 8/2001 | Lo et al. | | |
| 2003/0200353 A1 * | 10/2003 | Dogra et al. | ...... | 709/321 |
| 2004/0234152 A1 * | 11/2004 | Liege et al. | ...... | 382/254 |
| 2008/0069121 A1 * | 3/2008 | Adamson et al. | ...... | 370/401 |

FOREIGN PATENT DOCUMENTS

| | | |
|---|---|---|
| JP | 5-63749 | 3/1993 |
| JP | 2003-274100 | 9/2003 |
| JP | 2004-282145 | 10/2004 |
| JP | 2005-12829 | 1/2005 |
| JP | 2005-27124 | 1/2005 |
| JP | 2005-204279 | 7/2005 |
| JP | 2006-20341 | 1/2006 |

OTHER PUBLICATIONS

Alan Trick, An OVerview of the REST Architecture, Mar. 29, 2007.*
Japanese Office Action issed Jul. 26, 2011, in Patent Application No. 2006-191986.
Hisashi Nakata, et al., "A Development of Programming Communication Interface for MHS-EDI", NTT R&D, vol. 44, No. 2, Feb. 10, 1995, 12 pages (with Partial English Translation).

* cited by examiner

*Primary Examiner* — Lechi Truong
(74) *Attorney, Agent, or Firm* — Oblon, Spivak, McClelland, Maier & Neustadt, L.L.P.

(57) ABSTRACT

A network apparatus connected to at least one terminal apparatus via a network is disclosed. The terminal apparatus instructs operation of hardware unique to the network apparatus. The network apparatus includes an interface part for communicating with the terminal apparatus by using the same protocol as the terminal apparatus. The interface part receives an instruction to operate the hardware from various types of software executed in the terminal apparatus and instructs the hardware to operate in accordance with the received instruction.

14 Claims, 23 Drawing Sheets

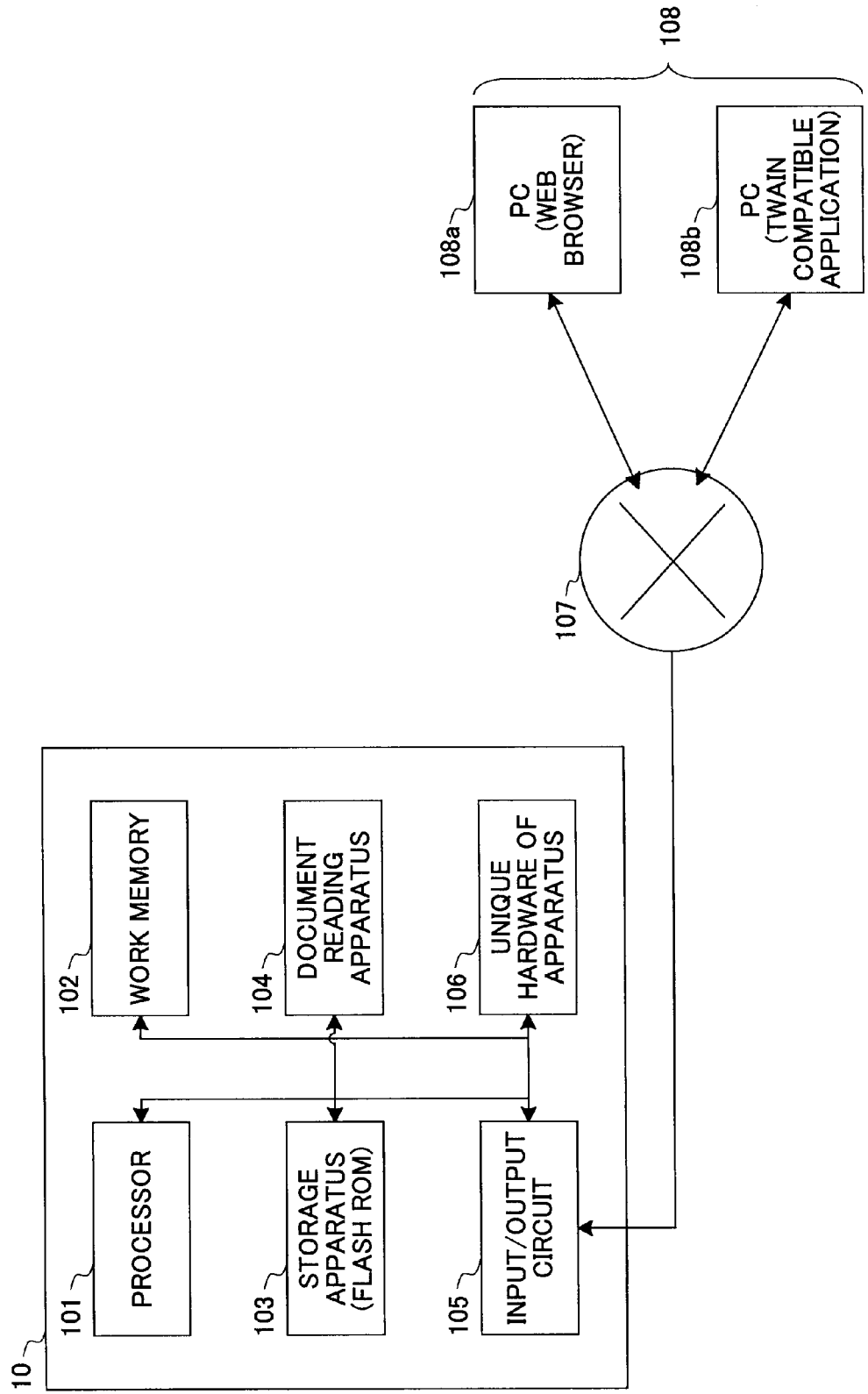

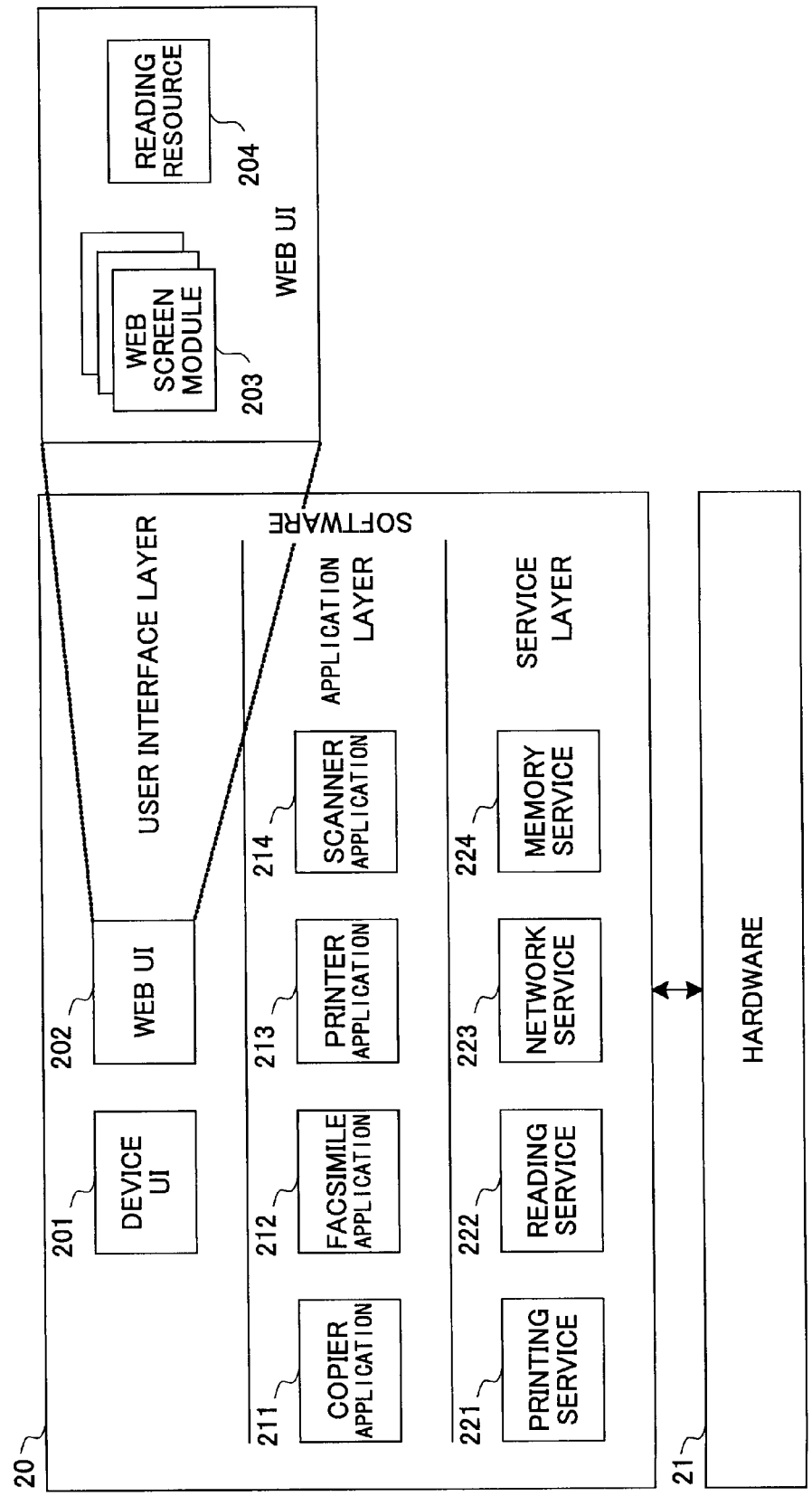

FIG.3A

| RESOURCE TYPE | RESOURCE URL |
|---|---|
| IMAGE | http://hostname/scan/image |
| STATE OF READING APPARATUS | http://hostname/scan/state |

FIG.3B

| NAME OF PARAMETER | DESCRIPTION (* INDICATING VALUE UPON NO DESIGNATION) |
|---|---|
| resolution | RESOLUTION. DESIGNATE FROM ONE OF 25 dpi, 100 dpi(*), 200dpi, 300dpi, 400dpi, 600dpi, 1200dpi |
| density | READING DENSITY. DESIGNATE FROM ONE OF 1, 2, 3(*), 4, 5 |
| type | TYPE OF DOCUMENT. DESIGNATE FROM ONE OF TEXT, ILLUSTRATION, PHOTOGRAPH(*) |
| size | READING SIZE. DESIGNATE FROM ONE OF A4(*), A5, A6, B5, B6, POSTCARD, UNDEFINED SIZE |
| customsize | READING AREA UPON DESIGNATION OF UNDEFINED SIZE. DESIGNATE START COODINATES AND END COORDINATES |
| scanway | DOCUMENT PLACEMENT LOCATION. DESIGNATE FROM ONE OF ADF, CONTACT GLASS, AUTOMATIC (*) |
| colormode | COLOR MODE. DESIGNATE FROM ONE OF COLOR (*), GRAY SCALE, MONOCHROME |
| orientation | DOCUMENT PLACEMENT ORIENTATION. DESIGNATE FROM ONE OF PORTRAIT (*), LANDSCAPE |
| fileformat | FILE FORMAT. DESIGNATE FROM ONE OF JPEG (*), MULTI-PAGE PDF, SINGLE PAGE PDF, MULTI-PAGE TIFF, SINGLE PAGE TIFF |
| errorformat | DATA FORMAT UPON ERROR. DESIGNATE FROM ONE OF HTML (*), XML |

FIG.3C

| IN A CASE OF PERFORMING PREVIEW | GET http://hostname/scan/image?resolution=25 HTTP/1.1 |
|---|---|
| IN A CASE OF READING PLURAL MONOCHROME DOCUMENTS AND OBTAINING A PDF FILE | GET http://hostname/scan/image?resolution=200&type=text&colormode=mono&fileformat=pdf HTTP/1.1 |

FIG.3D

| IN A CASE OF OBTAINING STATE OF READING APPARATUS | GET http://hostname/scan/state HTTP 1.1 |
|---|---|

FIG.3E

```xml
<?xml version="1.0" encoding="UTF-8" ?>
<state>
 <adf>
   <type>adf</type>
   <original>exist</original>
   <error>none</error>
 </adf>
 <scanning>
   <state>remotescanning</state>
   <readpage>1</readpage>
 </scanning>
</state>
```

```
<?xml version="1.0" encoding="UTF-8"?>
<result>
 <error>
   <errorKind>cannotExec</errorKind>
 </error>
</result>
```

```
<?xml version="1.0" encoding="UTF-8"?>
<result>
 <error>
   <errorKind>processingError</errorKind>
 </error>
</result>
```

NETWORK APPARATUS, TERMINAL APPARATUS, PROGRAM, AND RECORDING MEDIUM

BACKGROUND OF THE INVENTION

1. Field of the Invention

The present invention relates to a network apparatus, a terminal apparatus, a program, and a recording medium, and more particularly to a network apparatus for operating its own unique hardware based on an instruction from a terminal apparatus, a terminal apparatus for remotely operating unique hardware of the network apparatus, a program for rendering the network apparatus to operate, and a computer-readable recording medium on which the program is recorded.

2. Description of the Related Art

As one known example, there is a system having an apparatus connected to a terminal apparatus via a network, in which the apparatus reads an original (document) placed on its original plate in accordance with an instruction from the terminal apparatus. For example, Japanese Laid-Open Patent Application No. 2003-274100 (hereinafter referred to as "Patent Document 1") discloses a system allowing a multi-function machine (MFP) in a network to conduct an original document reading process by using rsh protocol.

Patent Document 1 also discloses a method of remotely reading an original document by using rsh protocol used in a TWAIN driver (network TWAIN driver).

The rsh protocol used in the TWAIN driver, however, has the following difficulties.

The first difficulty is that the rsh protocol is not commonly used compared to, for example, the widely used HTTP (HyperText Transfer Protocol). Another difficulty is that the rsh protocol is not suited for transmitting image data since it is a protocol configured to operate by receiving commands. Therefore, it is difficult to design and implement with respect to software used for devices or software used for clients. Yet another difficulty is that the rsh protocol cannot be used from a Web browser.

SUMMARY OF THE INVENTION

The present invention may provide a network apparatus, a terminal apparatus, a program, and a recording medium that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a network apparatus, a terminal apparatus, a program, and a recording medium particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a network apparatus connected to at least one terminal apparatus via a network, the terminal apparatus instructing operation of hardware unique to the network apparatus, the network apparatus including: an interface part for communicating with the terminal apparatus by using the same protocol as the terminal apparatus; wherein the interface part receives an instruction to operate the hardware from various types of software executed in the terminal apparatus and instructs the hardware to operate in accordance with the received instruction.

Furthermore, another embodiment of the present invention provides a terminal apparatus connected to a network apparatus via a network for remotely operating the hardware unique to the network apparatus, the terminal apparatus including: a device driver for instructing operation of the hardware; wherein the device driver communicates with the network apparatus by using the same protocol used by a plurality of other terminal apparatuses connected to the network apparatus via the network.

Furthermore, another embodiment of the present invention provides a program installed in a network apparatus connected to at least one terminal apparatus via a network, the terminal apparatus instructing operation of hardware unique to the network apparatus, the network apparatus including a storage apparatus and a processor, the processor including: an interface function part for communicating with the terminal apparatus by using the same protocol as the terminal apparatus; wherein the interface function part receives an instruction to operate the hardware from various types of software executed in the terminal apparatus and instructs the hardware to operate in accordance with the received instruction.

Other objects and further features of the present invention will be apparent from the following detailed description when read in conjunction with the accompanying drawings.

BRIEF DESCRIPTION OF THE DRAWINGS

FIG. 1 is a schematic diagram showing an exemplary configuration of a system including a network apparatus and a terminal apparatus according to an embodiment of the present invention;

FIG. 2 is a schematic diagram showing an exemplary configuration of software used by a network apparatus according to an embodiment of the present invention;

FIG. 3A is a table showing resource URLs of an image resource and a state resource of a document reading apparatus according to an embodiment of the present invention;

FIG. 3B is a table showing parameters of an image resource according to an embodiment of the present invention;

FIG. 3C shows examples of using image resources in a case where a preview image is desired when performing image reading from a Web browser and a case where the user desires to read out data from plural monochrome documents and obtain the read out data in the form of a PDF file according to an embodiment of the present invention;

FIG. 3D shows an example of using a state resource of a document reading apparatus according to an embodiment of the present invention;

FIG. 3E shows an example of XML format data obtained by calling (accessing) an interface of a state resource of a document reading apparatus according to an embodiment of the present invention;

DESCRIPTION OF THE PREFERRED EMBODIMENTS

Figure 4A:
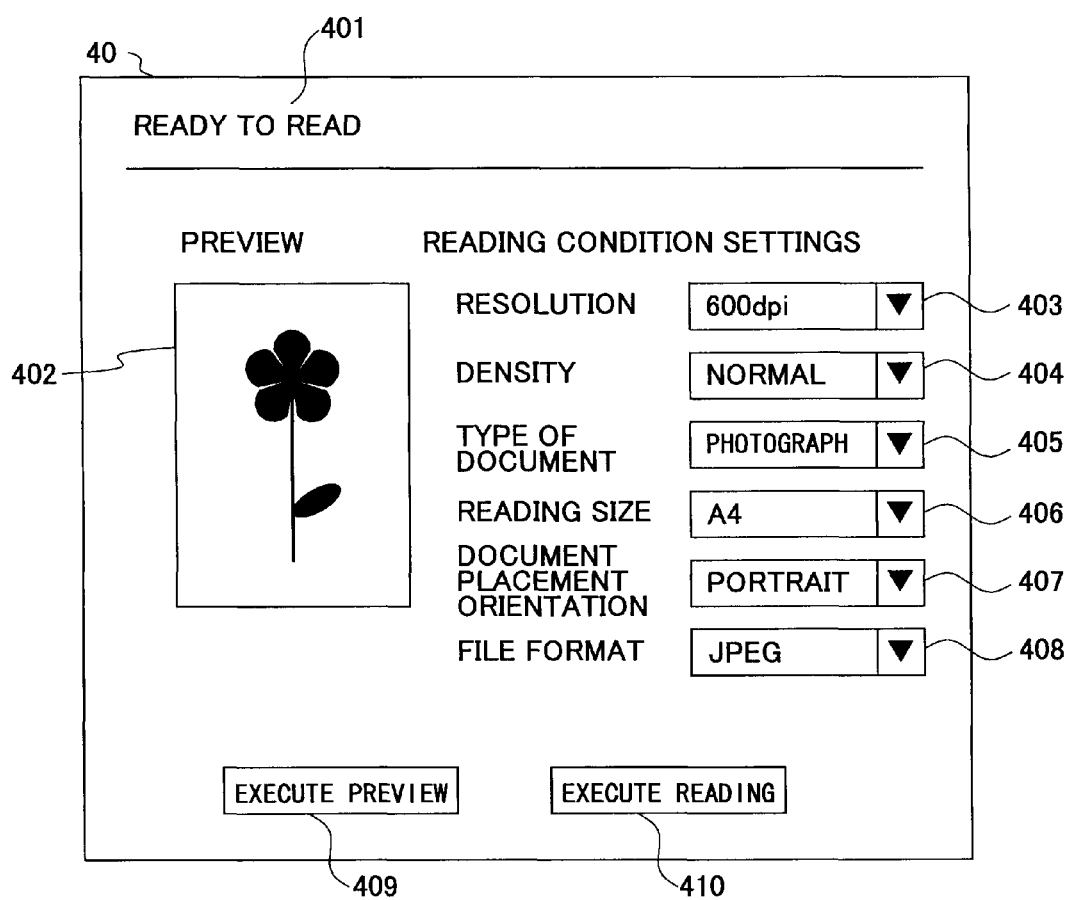
FIGS. 4A-4C are schematic diagrams showing examples of screens displayed on a Web browser operated by the user in a case where the user attempts to read a document by using a Web browser according to an embodiment of the present invention.

In the following, embodiments of the present invention will be described with reference to the accompanying drawings.

FIG. 1 is a schematic diagram showing an exemplary configuration of a system including a network apparatus and a terminal apparatus according to an embodiment of the present invention. The system shown in FIG. 1 includes a network apparatus 10 and one or more terminal apparatuses (PC) 108 connected to the network apparatus 10 via a predetermined network (e.g., LAN) 107.

The network apparatus 10 includes a processor 101, a work memory 102, a storage apparatus 103 including a recording medium (e.g., flash ROM), a document reading apparatus 104, an input/output circuit 105, and unique hardware of the network apparatus (hereinafter also referred to as "unique hardware" or "unique hardware items") 106. It is to be noted that the document reading apparatus 104 may be included as one of the unique hardware items 106 (described below).

The processor 101 conducts, for example, control of the network apparatus itself. The processor 101 operates the document reading apparatus 104 and the unique hardware 106 for executing unique functions of the network apparatus 10. The processor 101 is also used for executing a Web server function of the network apparatus 10.

The work memory 102 is used as a space for executing software or temporarily storing read out images. The storage apparatus 103 includes a recording medium (e.g., flash ROM) capable of electrically re-writing data. The storage apparatus 103 is for storing, for example, control programs used for executing various functions of the network apparatus 10 and storing other software including a program of the present invention.

The input/output circuit 105 is used for connecting to the network 107. The document reading apparatus 104 is for reading data from a document placed on an original plate (not shown). The unique hardware 106 includes any hardware unique to one or more network apparatuses 10 for conducting a Web server function of the network apparatus 10.

The network apparatus 10 shown in FIG. 1 is connected to two terminal apparatuses 108 (108a, 108b) via the network 107. The terminal apparatus 108 is operated (manipulated) by a user, to thereby allow various instructions of the user to be transmitted to the network apparatus 10.

Among the two terminal apparatuses 108, the terminal apparatus 108a is for allowing a user to transmit various instructions to the network apparatus 10 by using a Web browser, and the terminal apparatus 108b is for allowing a TWAIN driver to transmit various instructions to the network apparatus 10 by using a TWAIN compatible application.

TWAIN is a type of specification that is used for interconnecting an image input device (e.g., digital camera) and a personal computer. If an image input device compatible with TWAIN is used, various instructions can be transmitted by using a TWAIN compatible application.

FIG. 2 is schematic diagram showing an exemplary configuration of software used by the network apparatus 10 according to an embodiment of the present invention. The network apparatus 10 shown in FIG. 2 includes software 20 and hardware 21.

The software 20 includes a user interface layer, an application layer, and a service layer. The user interface layer is for providing a user interface for the user. The application layer is for realizing each function of an application. The service layer is for controlling the hardware 21 to provide a corresponding function to each application.

The user interface layer includes a device user interface (UI) 201 and a Web user interface (UI) 202. The device UI 201 provides a user interface for a control panel of the network apparatus 10. The Web UI 202 provides a user interface for a terminal apparatus of the user so that the user can operate (manipulate) the network apparatus by using a Web browser or a TWAIN compatible application.

The Web UI 202 includes a Web screen module 203 and a reading resource 204. The Web screen module 203 is provided for each screen. The Web screen module 203 generates a screen to be displayed by the Web browser or the TWAIN compatible application and performs various processes (e.g., changing of settings) upon request. The reading resource 204 is a generic name for the below-described image resource and a status resource of the document reading apparatus 104.

The application layer includes a copier application 211, a facsimile application 212, a printer application 213 and a scanner application 214. The copier application 211 is for realizing a copier function. The facsimile application 212 is for realizing a facsimile function. The printer application 213 is for realizing a printer function. The scanner application is for realizing a scanner function.

The service layer includes a printing service 221, a reading service 222, a network service 223, and a memory service 224. The printing service 221 is for controlling a plotter apparatus included in the hardware 21. The reading service 222 is for controlling the document reading apparatus 104. The network service 223 is for controlling the input/output circuit 105. The memory service 224 is for managing the work memory 102.

For example, in a case where the user desires to copy a document (original) by using the control panel of the network apparatus 10, the device UI 201 first receives an instruction from the user. Then, the device UI 201 sends an instruction indicating the content of a copying operation to be executed to the copier application 211. The copier application 211, in accordance with the copying operation sent by the device UI 201, instructs the reading service 222 and the printing service 221 to perform a reading and printing of the document. Thereby, the user can receive output of a copy of the document (copier output).

FIGS. 3A-D are schematic diagrams showing URLs, parameters, and examples of usage regarding a REST architecture interface provided by the Web UI 202 for remotely performing a reading process.

It is to be noted that REST is an abbreviation of Representational State Transfer which indicates a simple Web based interface using, for example, XML or HTTP. REST has the following characteristics that are significantly different from those of SOAP (Simple Object Access Protocol).

The service providing side does not store states of communications among messages (commonly referred to as "session data"). Having no such session data stored is referred to as "stateless". The service providing side corresponds to a side for receiving instructions. The service requesting side corresponds to the side giving out instructions. Furthermore, the service(s) provided by the providing side is not actually a service but a resource (data). The resource is uniquely identified by URI (Uniform Resource Identifier).

In REST, a resource can be controlled by using methods defined by HTTP such as obtain (GET), add (POST), update (PUT), and delete (DELETE). In this embodiment, resources corresponding to image reading and state of the document reading apparatus 104 are provided. Therefore, only the method of obtaining (GET) is supported in this embodiment.

FIG. 3A is a table showing resource URLs of an image resource and a state resource of the document reading apparatus 104. FIG. 3B is a table showing parameters of an image resource. The parameters of the image resource correspond to conditions for reading an image(s).

The parameters of the image resource include resolution, reading density, document type, reading size, reading area when an undefined size is designated, document placement location, color mode, document placement orientation, file format, and data format when an error occurs. Any one of the parameters of the image resource may be omitted. Default values may be used as parameters for an undesignated image resource.

For example, in a case where a preview image is desired when performing image reading from a Web browser, a resolution of 25 dpi is designated. In this example, the designation of other parameters is omitted since default values may be used for the other parameters. In a case where the user desires to read out data from plural monochrome documents and obtain the read out data in the form of a PDF file, the designated resolution is 200 dpi, the designated document type is text, the designated color mode is monochrome, and the designated file format is multi-page PDF. Default values may be used for the parameters corresponding to reading density, reading size, and document placement orientation. The parameter corresponding to document placement location may be set automatically. Therefore, the parameters corresponding to reading density, reading size, document placement orientation, and orientation placement position may be omitted. FIG. 3C shows examples of using image resources in a case where a preview image is desired when performing image reading from a Web browser and a case where the user desires to read out data from plural monochrome documents and obtain the read out data in the form of a PDF file.

Simply a corresponding interface needs to be called (accessed) in a case of a state resource of the document reading apparatus 104 since there are no parameters of the state resource of the document reading apparatus 104. FIG. 3D shows an example of using a state resource of the document reading apparatus 104. By accessing the interface corresponding to the state resource of the document reading apparatus 104, data in an XML format are obtained. The obtained XML format data include data indicating whether an automatic document feeding apparatus (ADF) is mounted on the document reading apparatus, data indicating the type of ADF, data indicating whether a document is placed on the ADF, data indicating the type of error occurring in the ADF, data indicating the operation state of the document reading apparatus 104, and data indicating the number of read out pages in a case of reading data by using an image resource.

FIG. 3E shows an example of XML format data obtained by calling (accessing) the interface of the state resource of the document reading apparatus 104. Furthermore, in the parameter "document placement orientation" of the image resource shown in FIG. 3B, "portrait" indicates a vertical orientation and "landscape" indicates a horizontal orientation.

The image resource and the state resource of the document reading apparatus 104 can be used anytime without any complicated preparations (e.g., session management, authentication) required by a Web service using SOAP, for example. The image resource and the state resource of the document reading apparatus 104 can be easily used even by a Web browser which is unable to perform complicated processes.

The below-described first embodiment shows an example of a case where the user gives out various instructions to the network apparatus 10 from a Web browser executed in the terminal apparatus 108a. The below-described second embodiment shows an example of a case where the user gives out various instructions to the network apparatus 10 from a TWAIN driver using a TWAIN compatible application executed in the terminal apparatus 108b.

First Embodiment

Figure 4B:
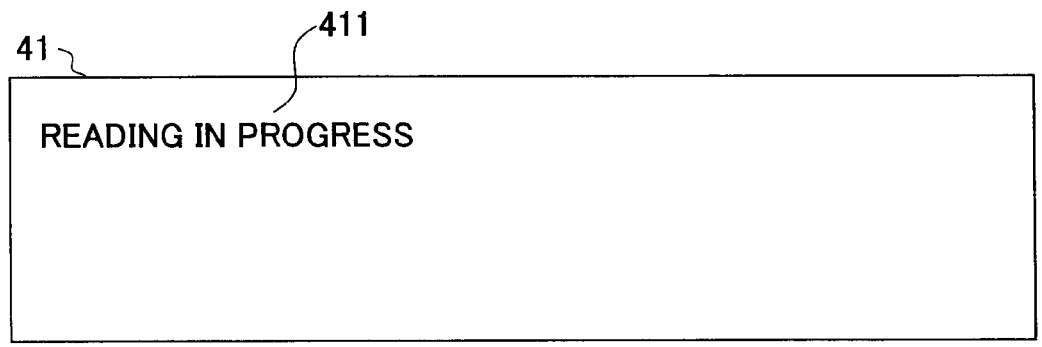
Figure 4C:
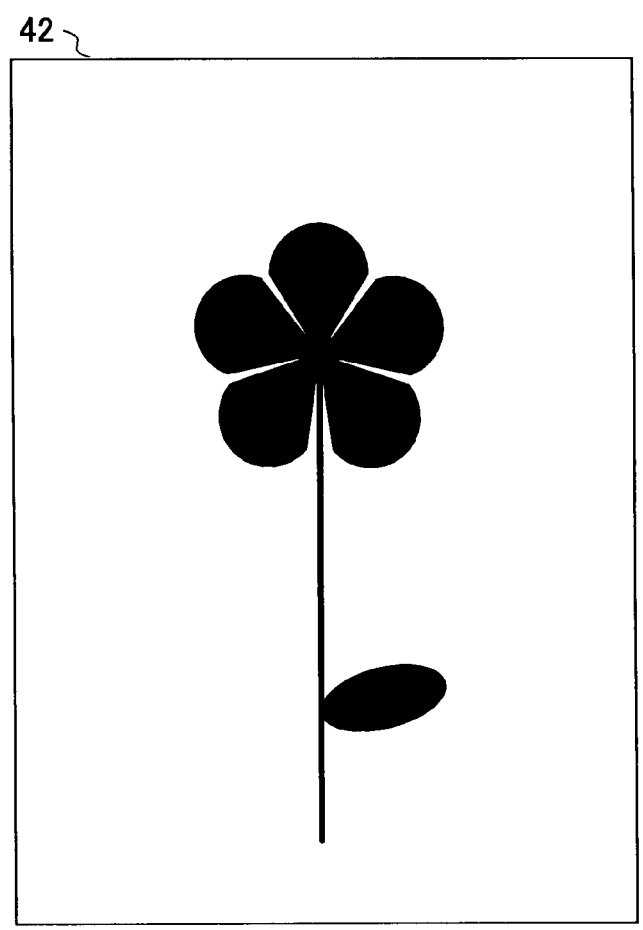

FIGS. 4A-4C are schematic diagrams showing examples of screens displayed on a Web browser operated by the user in a case where the user attempts to read a document by using the Web browser. In FIG. 4A, a control screen (operation screen) 40 displayed on the Web browser used by the user includes a message area 401 for displaying the state of executing a reading process or an error message, a preview area 402 for displaying a preview image, a reading condition setting area for setting various conditions in executing a reading process, a preview execution button 409 for executing a preview process, and a reading execution button 410 for executing a reading process.

The reading condition setting area includes a resolution setting selection box 403, a density setting selection box 404, a document type setting selection box 405, a reading size setting selection box 406, a document placement orientation setting selection box 407, and a file format setting selection box 408.

Reference numeral 41 in FIG. 4B shows a screen which is displayed when a reading process is in progress (hereinafter referred to as "reading-in-progress screen" or simply as "progress screen" for the sake of convenience). The progress screen 41 is displayed as a result of depressing or selecting (hereinafter simply referred to as "depressed" for the sake of convenience) the reading execution button 410. The progress screen 41 includes a message area 411 for indicating that a reading process is being executed or indicating an error message. When the network apparatus 10 finishes reading an image of the document and completes obtaining the data (image data) of the image, the progress screen 41 automatically switches to another screen 42 for indicating the obtained image data.

When the user first displays the control screen 40 by operating the Web browser, no images are shown in the preview area 402. However, when the user depresses the preview execution button 409, a document placed in the document reading apparatus 104 is read with a predetermined low resolution and displayed in the preview area 402.

Figure 5A:
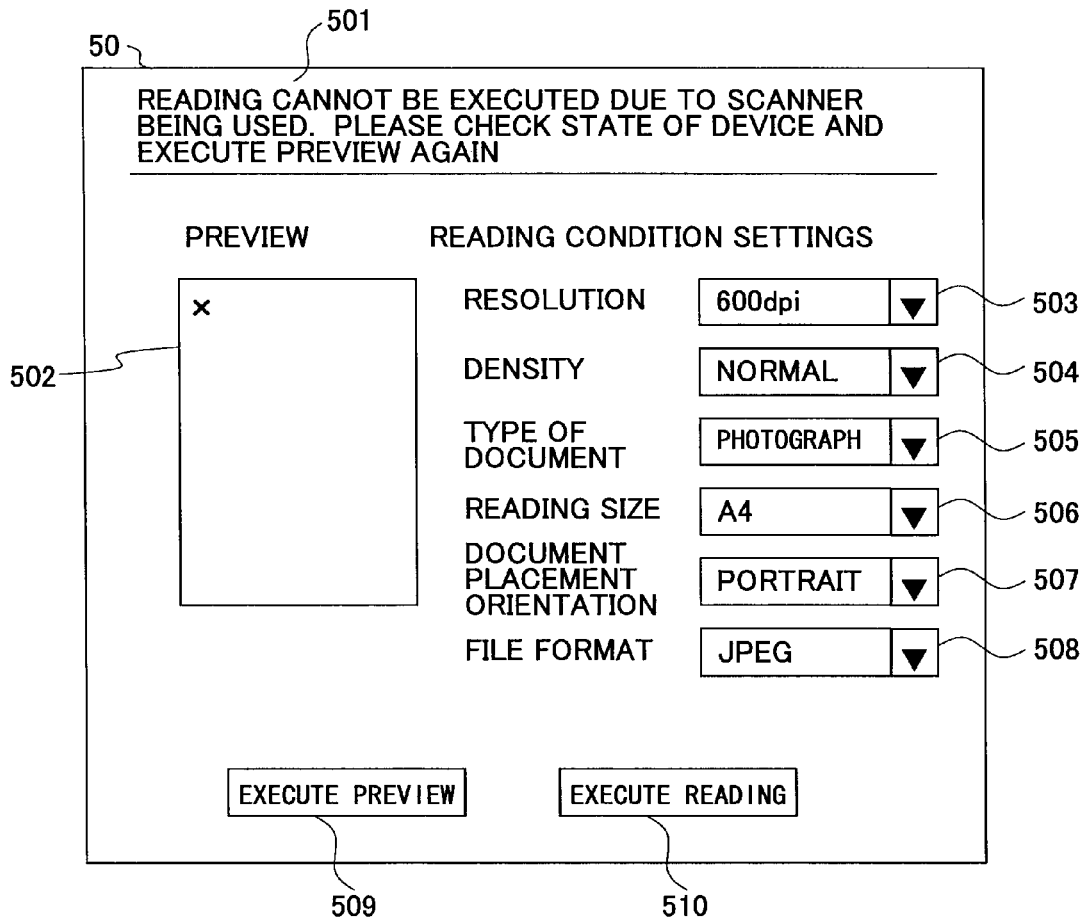
FIG. 5A is a schematic diagram showing an example where an error message is displayed on a screen displayed on a Web browser of the user according to an embodiment of the present invention.

In this case, however, when the document reading process with the Web browser cannot be executed (e.g., due to another user currently executing a reading process (scanner) with the control panel of the network apparatus 10, or work memory 102 currently being used for executing a printing process (printer)), the read out image cannot be displayed in the preview area 402. Thus, a message indicating the cause of the error is displayed in the message area 401. FIG. 5A is a schematic diagram showing an example where an error message is displayed on a screen displayed on the Web browser of the user. Since the screen shown in FIG. 5A is substantially the same as the screen shown in FIG. 4A except for a part of the screen of FIG. 5A, like parts are not described in further detail.

Returning to FIG. 4A, default values initially set in the network apparatus 10 are displayed in the resolution setting selection box 403, the density setting selection box 404, the document type setting selection box 405, the reading size setting selection box 406, the document placement orientation setting selection box 407, and the file format setting selection box 408 for setting the conditions of the reading process.

In a case where the user requires no change in the default values, the user may depress the reading execution button 410. By depressing the reading execution button 410, the progress screen 41 is displayed in another window indicating that the reading process is in progress. After the reading process is completed, the screen 42 is displayed. In a case where the user desires a resolution different from the default value, various choices of resolution can be displayed by clicking the resolution setting selection box 403. Accordingly, the user selects a desired resolution from the displayed choices (e.g., 1200 dpi, 600 dpi, 400 dpi, 300 dpi, 200 dpi, 100 dpi).

In a case where a document is desired to be read with a density different from that of the default value, the user clicks the density setting selection box 404 for displaying choices of density and selects a desired density from the displayed choices. For example, density may be selected from five levels (e.g., level 1 through 5) or from three types (e.g., dark, normal, light).

In a case where a document is desired to be read as a document type different from that of the default value, the user clicks the document type setting selection box 405 for displaying choices of document type and selects a desired document type from the displayed choices. The types of document may include, for example, "photograph", "illustration", and "text". By selecting a document type, an image process suited for the selected document type can be performed on the image read out from a document.

In a case where a document is desired to be read as a document having a size different from that of the default value, the user clicks the reading size setting selection box 406 for displaying choices of reading size and selects a desired reading size from the displayed choices. The types of reading sizes may include, for example, "A4", "A5", "A6", "B5", "B6", "postcard", and "undefined size". A square box indicating the reading area is displayed in the preview area 402 in accordance with the selected reading size.

By using a mouse (not shown) to perform a dragging maneuver on the preview area 402, the dragged area is displayed as a square box. The area of the square box defines the reading area. By using the mouse to perform a dragging maneuver on one of the sides of the square box, the shape of the square box can be changed. Furthermore, by using the mouse to perform a dragging maneuver on an inside part of the square box, the position of the reading area can be moved without changing the shape of the square box. In addition, by using the mouse to perform a dragging maneuver on the preview area 402, the reading size setting selection box 406 is automatically set as "undefined size".

Although these maneuvers may be executed without displaying a preview image in the preview area 402, in this embodiment, the mouse is used to select the reading area by referring to the preview image displayed in the preview area 402.

In a case where a document is desired to be placed and read in a direction (orientation) different from that of the default value, the user clicks the document placement orientation setting selection box 407 for displaying choices of orientation and selects a desired orientation from the displayed choices. The orientations for placing a document may include, for example, "portrait" and "landscape". By selecting a document placement orientation, an image is obtained by reading a document in the selected orientation (direction).

In a case where a document is desired to be read with a file format different from that of the default value, the user clicks the file format setting selection box 408 for displaying choices of file format and selects a desired file format from the displayed choices. The file formats may include, for example, "JPEG" and "multi-page PDF. By selecting a file format, an image is obtained by reading a document in accordance with the selected file format.

In a case where the user changes the reading condition in the density setting selection box 404 and depresses the preview execution button 409, a preview process is executed by displaying a preview image in the control screen 40 in accordance with the density set in the density setting selection box 404. That is, the user can confirm the results of changing the density condition by the preview image displayed in the preview area 402.

Likewise, in a case where the user changes the reading condition in the document type setting selection box 405 and depresses the preview execution button 409, a preview process is executed by displaying a preview image in the control screen 40 in accordance with the document type set in the document type setting selection box 405. In executing the preview process, an image process suitable for the selected document type is performed on the image to be displayed as the preview image. Thus, the user can confirm the results of changing the document type by the preview image displayed in the preview area 402.

Figure 5B:
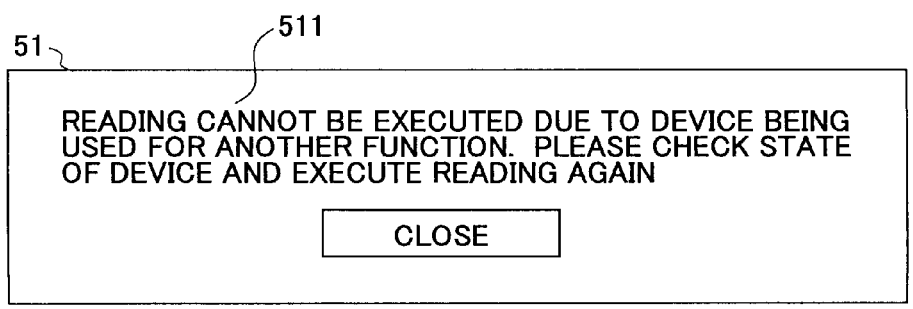
FIG. 5B shows an error screen in a case where an error message is displayed according to an embodiment of the present invention.

In a case where the reading execution button 410 is depressed, the above-described progress screen 41 is displayed as a separate window in the screen 40. In this case, when the document reading process with the Web browser cannot be executed (e.g., due to another user currently executing a reading process (scanner) with the control panel of the network apparatus 10, or work memory 102 currently being used for executing a printing process (printer)), a message indicating the cause of the error is displayed in the message area 411. FIG. 5B shows the screen 51 in a case where an error message is displayed. More specifically, an error message indicating the cause of the error is displayed in an error message area 511 in the screen 51.

Figure 6:
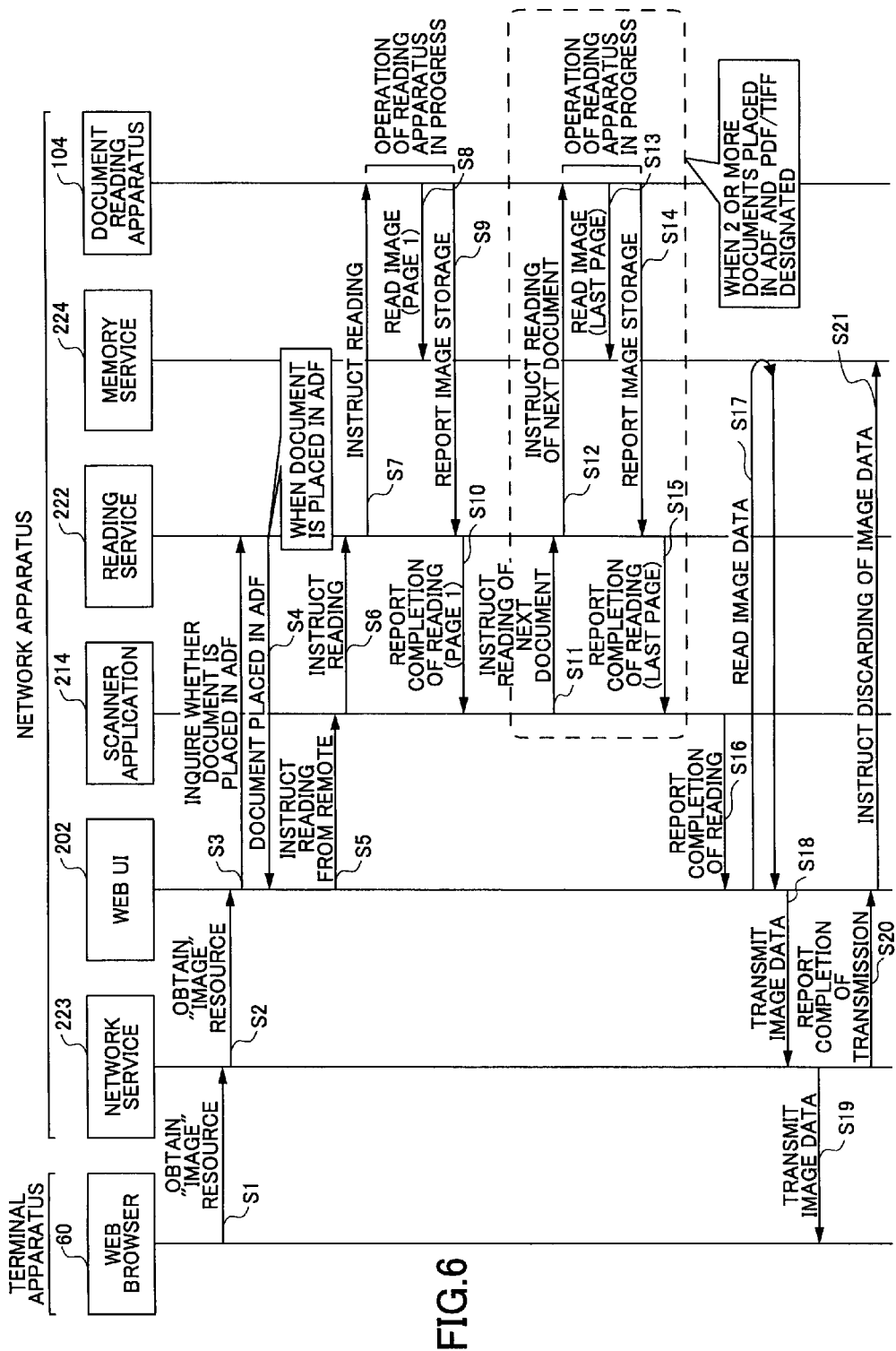
FIG. 6 is a sequence diagram showing an example of operations conducted by basic software in a case where the user uses a Web browser to read a document and obtain image data of the document according to an embodiment of the present invention.

FIG. 6 is a sequence diagram showing an example of operations conducted by basic software in a case where the user uses a Web browser 60 to read a document and obtain image data of the document. In this example, the user first depresses the preview execution button 409 or the reading execution button 410 in the screen 40 displayed by the Web browser 60.

Then, in Step S1, the Web browser 60 issues a request "obtain image resource" to the network apparatus 10 (Step S1). The network service 223 in the network apparatus 10 receives (accepts) the request issued by the Web browser 60.

Then, in Step S2, the network service 223 distributes the request received from the Web browser 60 in Step S1 to the Web UI 202 located in the user interface layer. That is, the network service 223 delivers the received request as is to the Web UI 202.

When the Web UI 202 receives the request from the network service 223, the network apparatus 10, based on the content of the request, comprehends that the button depressed in the screen 40 is the preview execution button 409 or the reading execution button 410 and that the reading conditions (e.g., resolution, density, document type, reading size) designated by the user are the parameters for obtaining the image resource.

In this example, "color mode", "document placement location", and "data format when error occurs" are not included in the request from the Web server 60. In such a case where reading conditions are not designated, default values are used. Therefore, in this example, "color", "automatic", and "HTML" are used as default values corresponding to "color mode", "document placement location", and "data format when error occurs". By designating "HTML" or "XML" as the data format when error occurs, it can be determined whether the software used in the terminal apparatus 108 is the Web browser 60 or a TWAIN driver.

Then, in Step S3, in a case where "automatic" is designated as the document placement location, the Web UI 202 queries the reading service 222 whether a document is placed in the automatic document feeder (ADF). Then, in Step S4, in a case where a document is placed in the ADF, it is regarded that the ADF has been designated as the document placement location. In a case where no document is placed in the ADF, it is regarded that the contact glass has been designated as the document placement location. Step S4 in FIG. 6 shows a case where a document is placed in the ADF. Accordingly, the reading service 222 reports that the document is placed in the ADF to the Web UI 202.

Then, in Step S5, the Web UI 202 sends an instruction "reading instruction from remote" along with parameters for obtaining the image resource to the scanner application 214. Then, in Steps S6 and S7, the scanner application 214, receiving the instruction from the Web UI 202, instructs the document reading apparatus 104 to perform reading via the reading service 222.

Then, in Step S8, the document reading apparatus 104 reads image data from a document, compresses the read image data, and stores the image data in an image memory managed by the memory service 224. After the document reading apparatus 104 completes the reading process, the compressing process, and the storing process, the operation proceeds to Step S9. In Step S9, the document reading apparatus 104 reports to the reading service 222 that image data have been stored in the image memory.

Then, in Step S10, the reading service 222, receiving the report of S9, reports that the reading process for the first page of the document is completed to the scanner application 214. When an unread document(s) is still remaining in the ADF in a case where multi-page PDF is designated as the file format for reading the documents placed in the ADF, the scanner application 214 instructs the document reading apparatus 104 to read the next document via the reading service 222 by performing the Steps S11-S15.

Then, in Step S16, the scanner application 214 reports completion of the reading process to the Web UI 202 in a case where i) the reading process is performed by placing the document on the contact glass ii) the reading process is performed by placing the document in the ADF and designating JPEG as the file format or iii) performing the reading process by placing the document in the ADF but having no document remaining in the ADF.

Then, in Step S17, the Web UI 202, receiving the report of completion from the scanner application 214, and reads out the image data stored in the image memory by the document reading apparatus 104. Then, in Step S18, the Web UI 202 requests the network service 223 to transmit the image data to the Web browser 60 of the user. Then, in Step S19, the network service 223 transmits the image data to the Web browser 60 of the user. When the transmission of the image data is completed, the operation proceeds to Step S20. In Step S20, the network service 223 reports completion of transmission to the Web UI 202.

Then, in Step S21, the Web UI 202 instructs the memory service 224 to discard the image data transmitted in Step S19 upon receiving the transmission completion report from the network service 223. Although it is possible to have the image data discarded at a timing other than the reception of the transmission completion report from the network service 223 (e.g., discarding a previous read out image data when storing a subsequent read out image data in the memory service 224), operation becomes complicated. Therefore, the operation shown in the sequence diagram of FIG. 6 is suitable from the aspect of simplifying operations.

Figure 7:
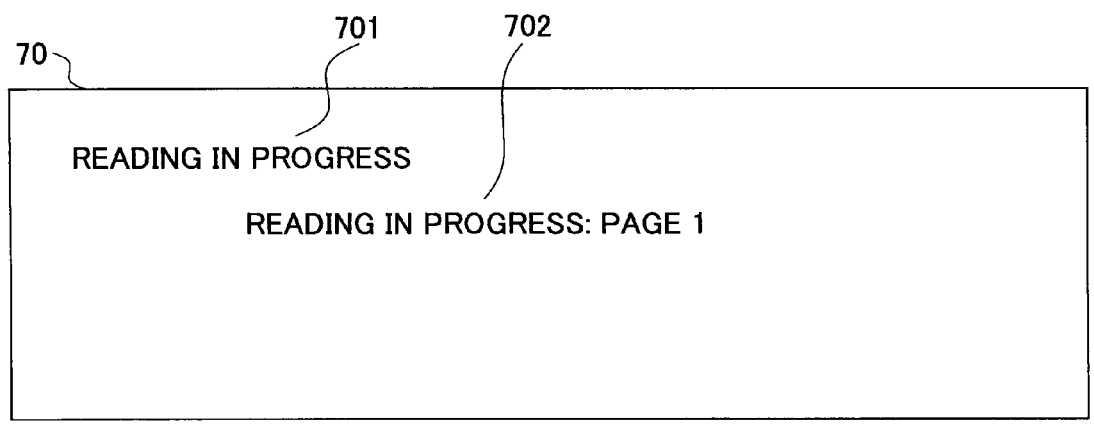
FIG. 7 is a schematic diagram showing an example of a reading-in-progress screen which is displayed in a terminal apparatus of the user for showing progress (state) of a reading process in a case where the user uses a Web browser to read a document and obtain image data of the document according to an embodiment of the present invention.

FIG. 7 is a schematic diagram showing an example of a reading-in-progress screen 70 (hereinafter also referred to as "progress screen 70" for the sake of convenience) which is displayed in the terminal apparatus 108 of the user for showing progress (state) of a reading process in a case where the user uses a Web browser to read a document and obtain image data of the document. The progress screen 70 is displayed when the reading process is in progress.

When the reading execution button 410 in the control screen 40 is depressed, the progress screen 70 is displayed in the Web browser 60. The progress screen 70 includes a message area 701 for displaying a message indicating that reading is in progress. The progress screen 70 also includes a progress state display area 702 that changes along with progress of the reading process. In this example, the progress state display area 702 displays the page number that is currently being displayed. When the network apparatus 10 completes reading an image from the document and the terminal apparatus 108 obtains data of the read image (image data) from the network apparatus 10, the progress screen 70 is automatically switched to another screen 42 that displays the obtained image data.

Figure 8:
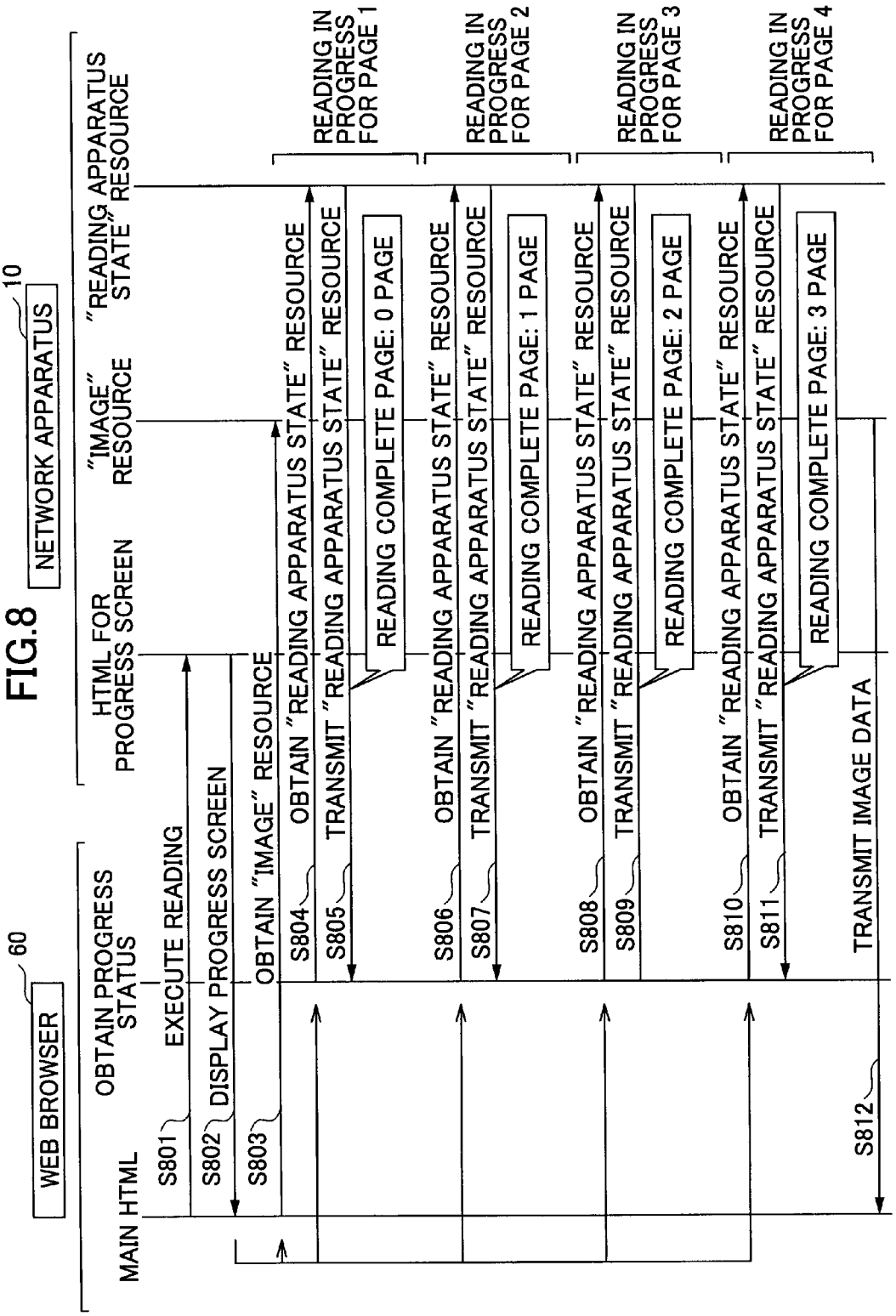
FIG. 8 is a sequence diagram showing an example of an operation for displaying progress (state) of a reading process in a terminal apparatus when the reading process is in progress according to an embodiment of the present invention.

FIG. 8 is a sequence diagram showing an example of an operation for displaying progress (state) of a reading process in the terminal apparatus 108 when the reading process is in progress. In this embodiment, the user uses a Web browser to read a document and obtain image data of the document. In other words, the sequence diagram shown in FIG. 8 illustrates an example of having the terminal apparatus 108 obtain information regarding progress of the reading process from the network apparatus 10 in a case where progress of the reading process (progress state) is displayed on the terminal apparatus 108.

In Step S801, when the reading execution button 410 of the control screen 40 is depressed by the user, the Web browser 60 requests the network apparatus 10 to transmit data of the progress screen 70. Then, in Step S802, the network apparatus 10 transmits HTML data of the progress screen 70 to the Web browser 60 in response to the request of Step S801.

The Web browser 60, receiving the HTML data of the progress screen 70, interprets the HTML data and displays the progress screen 70. Then, in Step S803, the Web browser 60 requests obtaining the image data written in the received HTML data to the network apparatus 10. The image data are obtained in the form of obtaining an "image" resource of the network apparatus 10.

Then, the network apparatus 10 begins to perform a reading process on a document(s), and the Web browser attempts to display the image data corresponding to the image requested in Step S803. However, no data are transmitted from the network apparatus 10 until the network apparatus 10 finishes reading images of all documents (pages). Therefore, the Web browser 60 is in a waiting state.

The Web browser 60 periodically requests obtaining a resource of the state of the reading apparatus 104 ("reading apparatus state" resource) in Steps S804, S806, S808, and S810 concurrently with the requesting of obtaining image data. The process of obtaining the reading apparatus state is performed by using, for example, a technology referred to as Ajax (Asynchronous JavaScript+XML).

In the sequence diagram shown in FIG. 8, since the document reading apparatus 104 is still in the middle of reading the first page of the document, the network apparatus 10 transmits "page 0" as the number of read pages (reading completed pages) in response to the first state obtaining request transmitted from the Web browser 60 in Step S804. The Web browser 60, receiving the "page 0" data, updates the message area 702 to indicate that reading of "page 1" is in progress.

It is to be noted that the Web browser 60 also obtains data other than the read number of pages when the Web browser 60 requests obtaining the resource of the state of the document reading apparatus 104. Such data include, for example, data regarding the type of ADF, data indicating whether an ADF is mounted, data indicating whether a document is placed in the ADF, and data indicating the operating state of the document reading apparatus 104. However, since such other data are not required by the Web browser 60 according to an embodiment of the present invention, the other data are simply ignored.

In Step S806, the Web browser 60 requests obtaining the "reading apparatus state" resource again after a predetermined period elapses. Then, since the document reading apparatus 104 has completed reading the first page of the document and is in the middle of reading the second page of the document, the network apparatus 10 transmits "page 1" as the number of read pages (reading completed pages) in response to the state obtaining request transmitted from the Web browser 60 in Step S806.

The Web browser 60, receiving the "page 1" data, updates the message area 702 to indicate that reading of "page 2" is in progress.

It is to be noted that the predetermined period prior to Step S806 may be an interval no greater than one second or an interval of a few seconds. Although the progress state can be displayed more promptly if the interval is shorter, it may overload the document reading apparatus 104 and the network environment. Therefore, considering that it takes more than a few seconds to read a single page of a document, it is preferable for the interval to be approximately one or two seconds.

Then, the same processes are performed on the remaining pages of the document in Steps S808-S811, to thereby complete the reading of the document. Then, in Step S812, the network apparatus 10, upon completing the reading of the document, transmits image data of the document to the Web browser 60. After the Web browser 60 completes receiving the image data, the Web browser, being in a waiting state (as described in Step S803), immediately displays the image(s) of the received image data.

Figure 9:
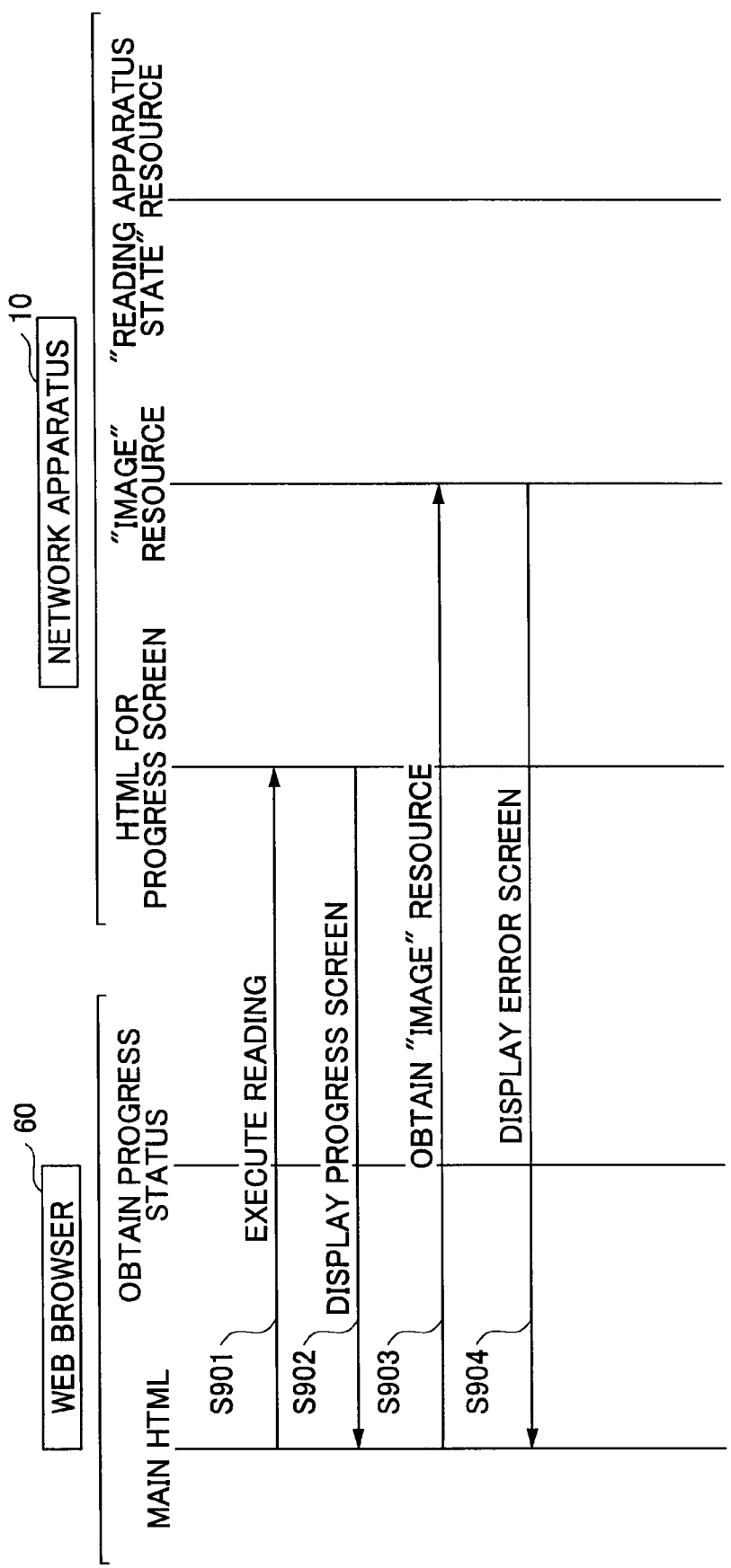
FIG. 9 is a sequence diagram showing an example of an operation for displaying an error screen on a Web browser manipulated by the user in a case where reading cannot be executed with a combination of reading conditions (parameters) designated by the user according to an embodiment of the present invention.

FIG. 9 is a sequence diagram showing an example of an operation for displaying an error screen 100 on a Web browser manipulated by the user in a case where reading cannot be executed with a combination of reading conditions (parameters) designated by the user.

For example, an error may occur for a low-cost network apparatus 10 having a small work memory 102 when the user designates reading a large size document with a high resolution. In this case, it is necessary to report this error to the user.

In Step S901, when the user depresses the reading execution button 410 in a case where 1200 dpi is set in the resolution setting selection box 403 and A4 is set in the reading size setting selection box 406, the Web browser 60 transmits a request for the progress screen (progress screen data) to the network apparatus 10.

Then, in Step S902, the network apparatus 10 transmits HTML data of the progress screen 70 to the Web browser 60 in response to the request of Step S901. The Web browser 60, receiving the HTML data of the progress screen 70, interprets the HTML data and displays the progress screen 70. Then, in Step S903, the Web browser 60 requests to obtain the image data written in the received HTML data from the network apparatus 10. The image data are obtained in the form of an "image" resource of the network apparatus 10.

Figure 10:
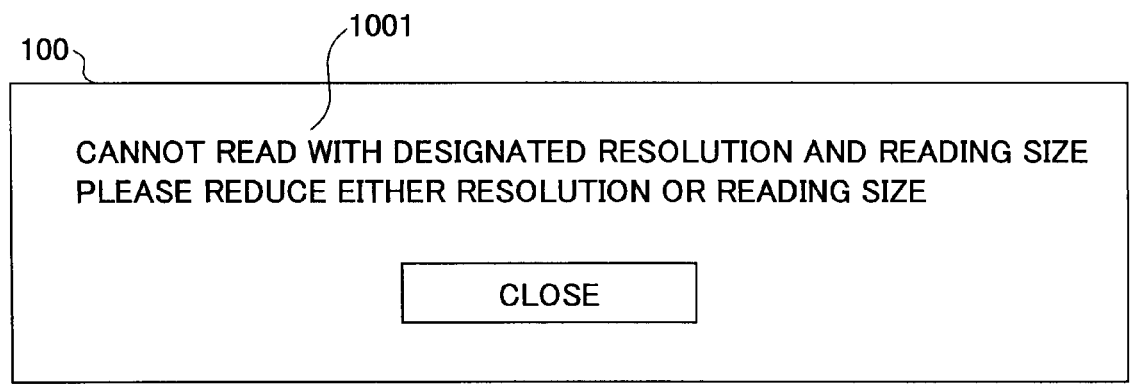
FIG. 10 is a schematic diagram showing an example of an error screen according to an embodiment of the present invention.

The network apparatus 10 confirms each parameter of the reading conditions. In this example, due to the constraint of the work memory 102, a document cannot be read with a size of A4 and a resolution of 1200 dpi. Therefore, in Step S904, the network apparatus 10 transmits HTML data of an error screen 100 (as shown in FIG. 10) to the Web browser 60 instead of transmitting HTML data of the progress screen 70. FIG. 10 is a schematic diagram showing an example of the error screen 100.

Figure 11:
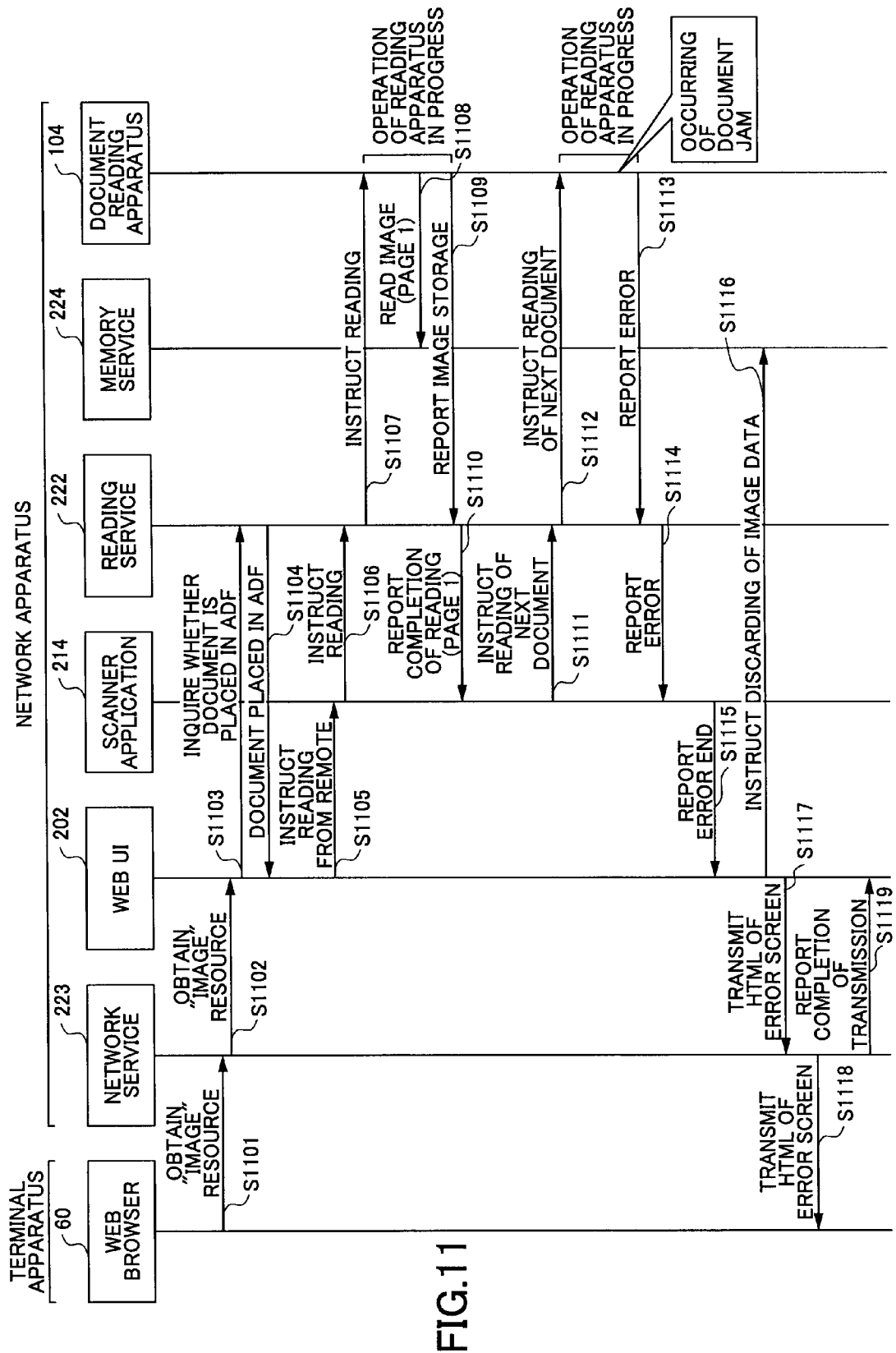
FIG. 11 is a sequence diagram showing an example of an operation in a case where an error occurs during a reading process according to an embodiment of the present invention.

FIG. 11 is a sequence diagram showing an example of an operation in a case where an error occurs during a reading process. Except for a portion of the sequence diagram of FIG. 11, the sequence diagram of FIG. 11 is substantially the same as the sequence diagram of FIG. 6. Thus, descriptions of same steps are omitted.

In FIG. 11, the processes performed in Steps S1101-S1112 are substantially the same as those performed in Steps S1-S12 of FIG. 6. In Steps S1113-S1114, when document jam (error) occurs in the ADF in the middle of reading the second page of the document, the document reading apparatus 104 reports the error to the scanner application through the reading service 222. Then, in Step S1115, the scanner application 214 reports to the Web UI 202 that the reading process has ended in error.

Then, in Step S1116, the Web UI 202, receiving the error end report, instructs the document reading apparatus 104 to discard the image data stored in the image memory. Then, in Step S1117, the Web UI 202 requests the network service 223 to transmit HTML data of an error screen 120 (see FIG. 12) to the Web browser 60 of the user.

Then, in Step S1118, the network service 223 transmits the HTML data of the error screen 120 to the Web browser of the user. Then, in Step S1119, the network service 223, after completing the transmission of the HTML data of the error screen 120, reports completion of the transmission to the Web UI 202.

Figure 12:
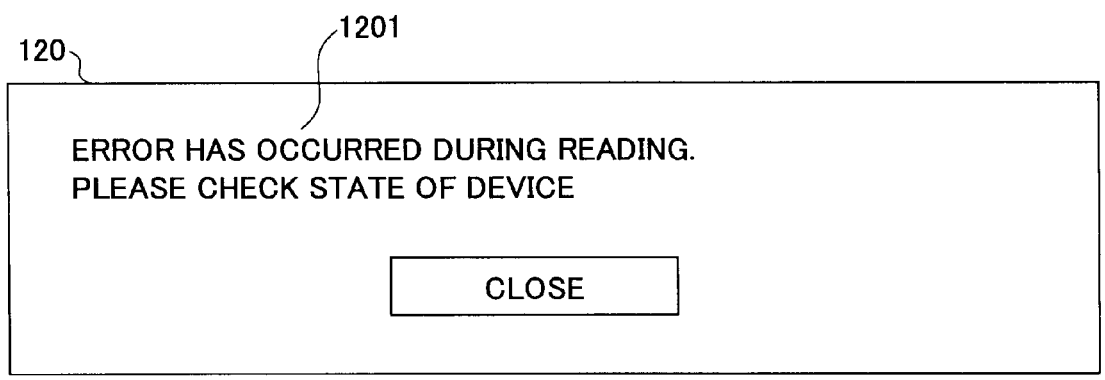
FIG. 12 is a schematic diagram showing an error screen in a case where document jam has occurred after depressing a document execution button according to an embodiment of the present invention.

FIG. 12 is a schematic diagram showing the error screen in a case where document jam has occurred after depressing the document execution button. Since HTML data cannot be displayed as an alternative of the read image, nothing is displayed in the preview area 402.

Although it is possible to discard the image data that has been read before the error occurred at a timing other the reception of the transmission completion report of Step S1119 (e.g., at a timing when storing the subsequent read out image data in the memory service 224), the operation becomes complicated. Therefore, the operation shown in the sequence diagram of FIG. 11 is suitable from the aspect of simplifying operations.

Second Embodiment

Figure 13:
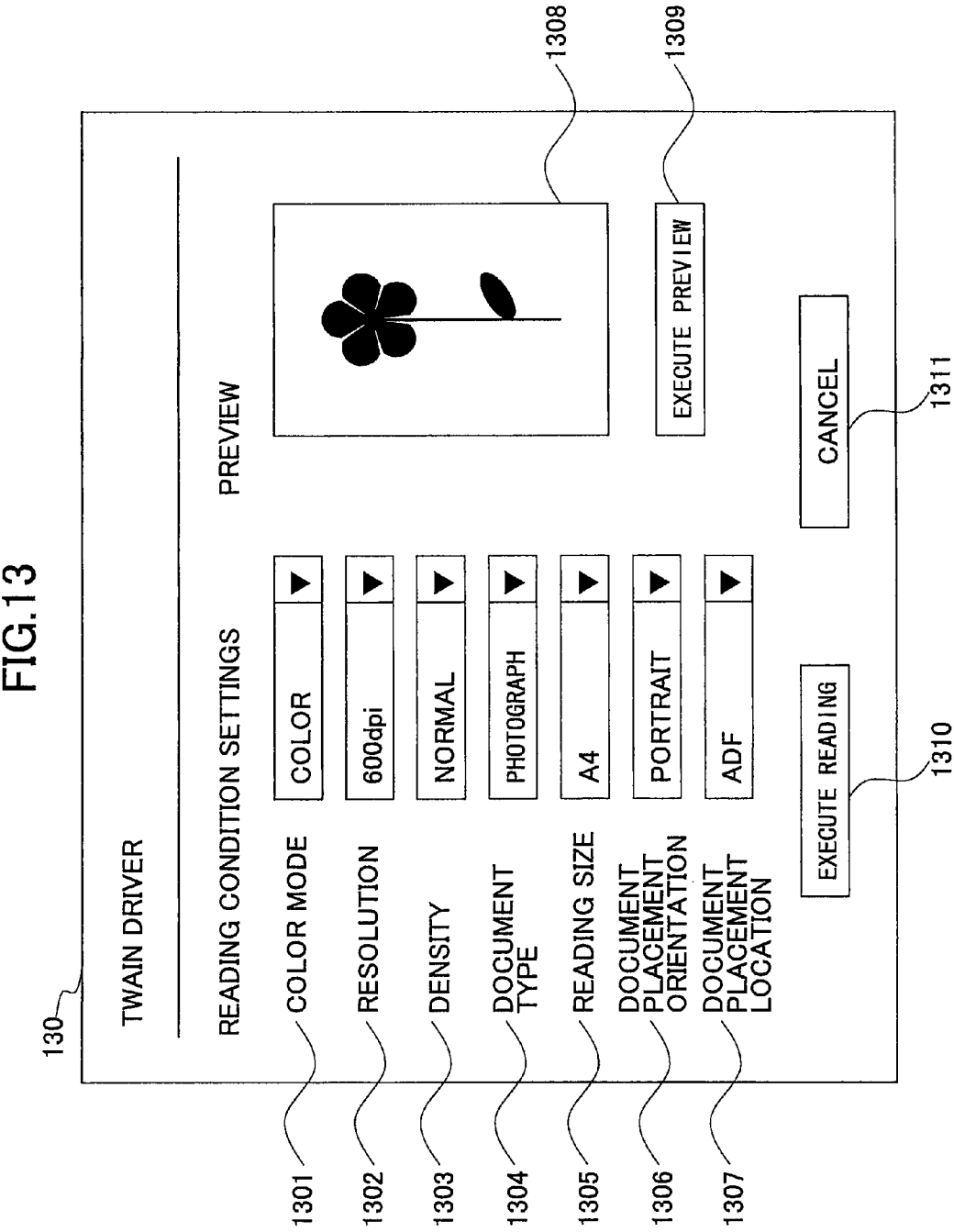
FIG. 13 is a schematic diagram showing an example of a screen displayed on a terminal apparatus operated by the user in a case where the user attempts to read a document with a TWAIN compatible application of a terminal apparatus by using a TWAIN driver according to an embodiment of the present invention.

FIG. 13 is a schematic diagram showing an example of a screen displayed on a terminal apparatus operated by the user in a case where the user attempts to read a document with a TWAIN compatible application of the terminal apparatus by using a TWAIN driver. In FIG. 13, a control screen (operation screen) 130 displayed on the terminal apparatus 108 used by the user includes a reading condition setting area for setting various conditions in executing a reading process, a preview area 1308 for displaying a preview image, a preview execution button 1309 for executing a preview process, a reading execution button 1310 for executing a reading process, and a cancel button 1311 for canceling the reading process and returning to the screen of the TWAIN compatible application (hereinafter also referred to as "application software").

The reading condition setting area for setting the condition of the reading process includes a color mode setting selection box 1301, a resolution setting selection box 1302, a density setting selection box 1303, a document type setting selection box 1304, a reading size setting selection box 1305, a document placement orientation setting selection box 1306, and a document placement location setting selection box 1307.

When the user first displays the control screen 130 by using the application software, no image is displayed in the preview area 1308. When the user depresses the preview execution button 1309, the document placed in the document reading apparatus 104 of the network apparatus 10 is read with a predetermined low resolution and displayed in the preview area 1308.

Figure 14:
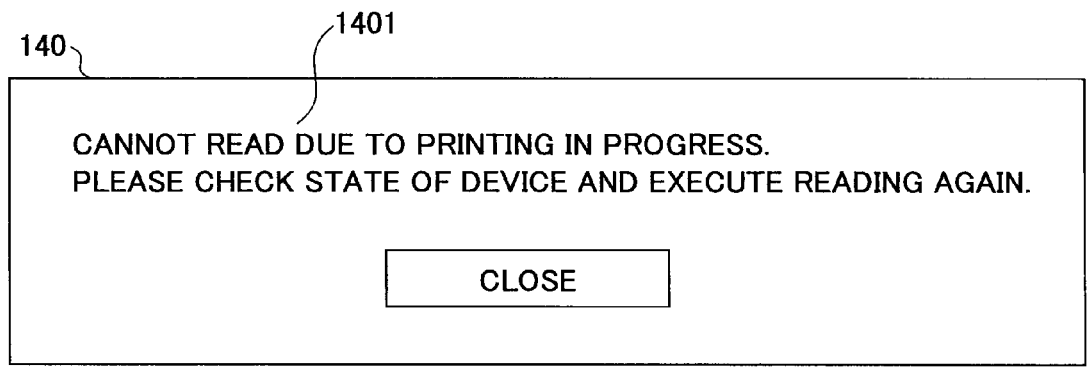
FIG. 14 shows an example of a pop-up dialog screen indicating an error according to an embodiment of the present invention.

In this case, however, when the document reading process with the TWAIN driver cannot be executed (e.g., due to another user currently executing a reading process (scanner) with the control panel of the network apparatus 10, or work memory 102 currently being used for executing a printing process (printer)), the read out image of the document cannot be displayed in the preview area 1308. Accordingly, as shown in FIG. 14, a pop-up dialog window is displayed for indicating the cause of the error. FIG. 14 shows an example of the pop-up dialog screen indicating the error.

In this example where a process of obtaining an "image" resource (reading process) cannot be executed due to an error such as another operation being in progress, the TWAIN driver executes a process of obtaining a "document reading apparatus state" resource of the document reading apparatus 104. Thereby, the TWAIN driver obtains the operating status of the document reading apparatus 104, identifies the cause of the error, and displays a message corresponding to the error in the pop-up dialog window.

Returning to FIG. 13, default values initially set to the network apparatus 10 are displayed in the color mode setting selection box 1301, the resolution setting selection box 1302, the density setting selection box 1303, the document type setting selection box 1304, the reading size setting selection box 1305, the document placement orientation setting selection box 1306, and the document placement location setting selection box 1307.

In a case where the user requires no change in the default values, the user may depress the reading execution button 1310. By depressing the reading execution button 1310, the read data are transferred to the application software of the terminal apparatus 108. In a case where the user desires a color mode different from the default value, various choices of color modes can be displayed by clicking the color mode setting selection box 1301. Accordingly, the user selects a desired color mode from the displayed choices (e.g., color, gray scale, and monochrome).

In a case where a document is desired to be read with a resolution different from that of the default value, the user clicks the resolution setting selection box 1302 and selects a desired resolution from the displayed choices. In a case where a document is desired to be read with a density different from that of the default value, the user clicks the density setting selection box 1303 for displaying choices of density and selects a desired density from the displayed choices.

In a case where a document is desired to be read as a document type different from that of the default value, the user clicks the document type setting selection box 1304 for displaying choices of document type and selects a desired document type from the displayed choices.

In a case where a document is desired to be placed and read in a direction (orientation) different from that of the default value, the user clicks the document placement orientation setting selection box 1306 for displaying choices of orientation and selects a desired orientation from the displayed choices.

In a case where a document is desired to be placed and read at a location different from that of the default value, the user clicks the reading placement location setting selection box 1307 for displaying choices of reading placement location and selects a desired reading placement location from the displayed choices. The locations for reading the document may be, for example, "ADF" or "contact glass". Thereby, the document can be read at the selected locations.

In a case where the user changes the reading condition in the color mode setting selection box 1301 and depresses the preview execution button 1309, a preview process is executed by displaying a preview image in the control screen 130 in accordance with the color mode set in the color mode setting selection box 1301. That is, the user can confirm the results of changing the color mode condition by the preview image displayed in the preview area 1308.

Likewise, in a case where the user changes the reading condition in the density setting selection box 1303 and depresses the preview execution button 1309, a preview process is executed by displaying a preview image in the control screen 130 in accordance with the density set in the density setting selection box 1303. That is, the user can confirm the results of changing the density condition by the preview image displayed in the preview area 1308.

Likewise, in a case where the user changes the document type setting selection box 1304 and depresses the preview execution button 1309, a preview process is executed by displaying a preview image in the control screen 130 in accordance with the document type set in the document type setting selection box 1304. In executing the preview process, an image process suitable for the selected document type is performed on the image to be displayed as the preview image. Thus, the user can confirm the results of changing the document type by the preview image displayed in the preview area 1309.

When the reading execution button 1310 is depressed, the reading process is initiated. After the reading process is completed, the read image data are transferred to the application software of the terminal apparatus 108 and displayed on the control screen 130. In this case, when the document reading process with the TWAIN driver cannot be executed (e.g., due to another user currently executing a reading process (scanner) with the control panel of the network apparatus 10, or work memory 102 currently being used for executing a printing process (printer)), the read image data are not transferred to the application software of the terminal apparatus 108 and the cause of the error is displayed in the pop-up dialog window.

Figure 15:
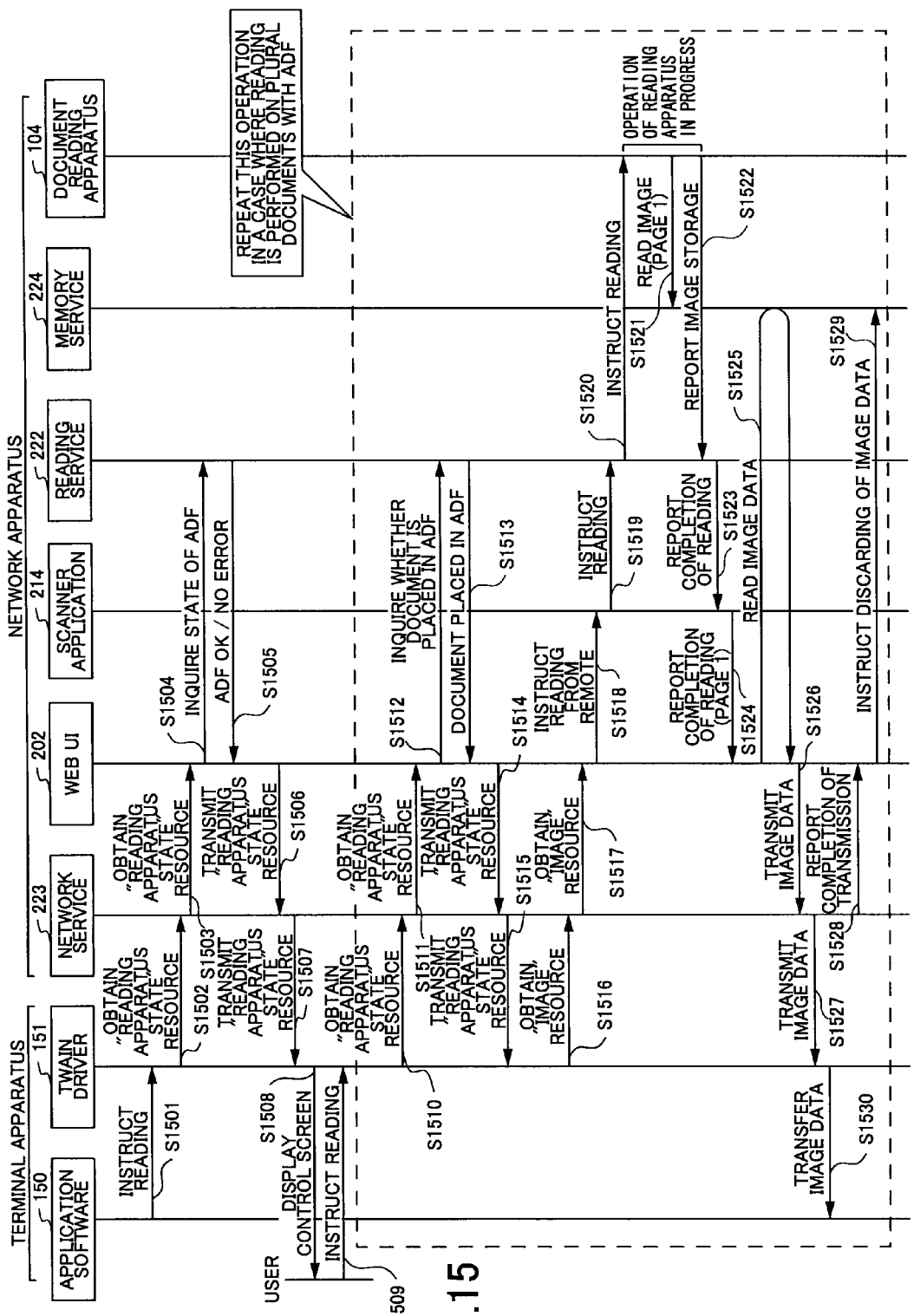
FIG. 15 is a sequence diagram showing an example of operations conducted by basic software in a case where the user uses a TWAIN driver to read a document placed in an ADF of a document reading apparatus and obtain image data of a document according to an embodiment of the present invention.

FIG. 15 is a sequence diagram showing an example of operations conducted by basic software in a case where the user uses a TWAIN driver to read a document placed in an ADF of a document reading apparatus and obtain image data of the document. In this example, the user first instructs the application software 150 of the terminal apparatus 108 to execute a reading process (TWAIN reading process). Then, in Step S1501, the application software 150 of the terminal apparatus 108 calls (accesses) the TWAIN driver 151. Then, in Step S1502, the TWAIN driver 151 issues (sends) a request for obtaining a "reading apparatus state" resource of the document reading apparatus 104 to the network apparatus 10.

The request issued from the TWAIN driver 151 is received (accepted) by the network service 223 in the network apparatus 10. Then, in Step S1503, the network service 223 distributes the request received from the TWAIN driver in Step S1502 to the Web UI 202. That is, the network service 223 delivers the received request as is to the Web UI 202.

Then, in Step S1504, the Web UI 202 receiving the request to obtain "reading apparatus state" of the document reading apparatus 104 queries the reading service 222 for various information items (data). The Web UI 202 may query, for example, whether an automatic document feeding apparatus (ADF) is mounted on the document reading apparatus 104, data indicating the type of ADF, data indicating whether a document is placed on the ADF, data indicating the type of error occurring in the ADF, data indicating the operation state of the document reading apparatus 104, and data indicating the number of read pages.

Then, in Step S1505, the reading service 222 may return corresponding data in response to the query from the Web UI 202 such as data indicating that an ADF is mounted on the document reading apparatus 104, data indicating that a document is placed on the ADF, data indicating that no error exists in the ADF, data indicating that the document reading apparatus 104 is not operating, data indicating that the document reading apparatus is in a standby state (reading not yet started), and data indicating that 0 pages have been read.

In Steps S1506 and S1507, the Web UI 202 transmits the data received from the reading service 222 to the TWAIN driver 151 via the network service 223. After the TWAIN driver 151 confirms that the ADF is mounted on the document reading apparatus 104 and that there is no error in the ADF, the TWAIN driver 151 adds "ADF" to the choices of the document placement location setting selection box 1307. Then, in Step S1508, the TWAIN driver 151 displays the control screen 130.

Since some of the above-described data from the network service 223 (e.g., data indicating that a document is placed on the ADF, data indicating that no error exists in the ADF, data indicating the operation state of the document reading apparatus 104, number of read pages when reading is in progress) are not required to be displayed on the control screen 130 of the TWAIN driver 151, such data are simply ignored.

Then, in Step S1509, the user depresses the preview execution button 1309 or the reading execution button 1310 on the control screen 130 of the TWAIN driver 151. Then, in Step S1510, the TWAIN driver 151 issues (sends) a request again for obtaining a "reading apparatus state" resource of the document reading apparatus 104 to the network apparatus 10, in the same manner as Step S1502.

Figure 16:
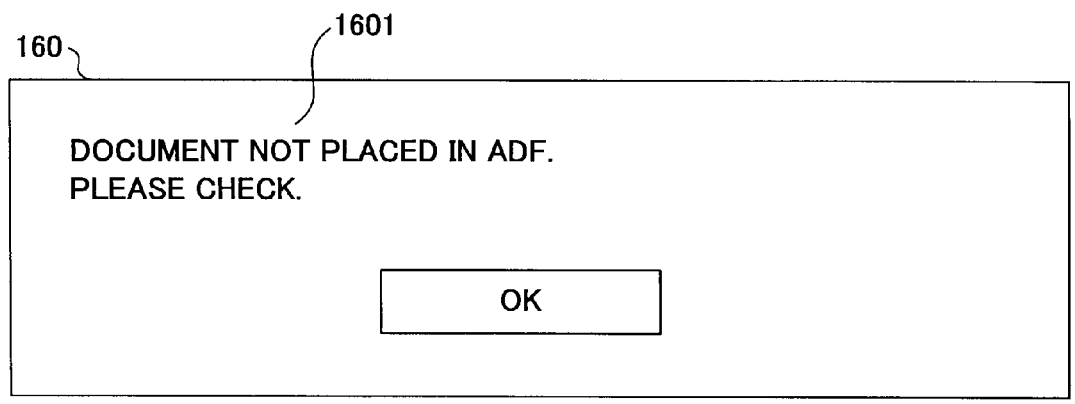
FIG. 16 is a schematic diagram showing an example of a pop-up window indicating an error according to an embodiment of the present invention.

Then, in Steps S1511-S1515, various data are transmitted to the TWAIN driver 151 in the same manner as Steps S1503-S1507. The TWAIN driver 151 refers to data indicating whether a document(s) is placed in the ADF. In a case where no document is placed in the ADF even though the user designated the ADF as the document placement location, a pop-up dialog window 160 is displayed indicating the error, as shown in FIG. 16. FIG. 16 is a schematic diagram showing an example of the pop-up window indicating an error.

Then, in Step S1516, the TWAIN driver 151 issues (sends) a request to obtain the next image resource. The network service 223 in the network apparatus 10 accepts (receives) the request issued from the TWAIN driver 151.

Then, in Step S1517, the network service 223 distributes the request received from the TWAIN driver in Step S1516 to the Web UI 202. That is, the network service 223 delivers the received request as is to the Web UI 202.

In a case where the color mode designated by the user is color or gray scale, the TWAIN driver 151 designates JPEG as its file format. In a case where the user designates monochrome as the color mode, the TWAIN driver 151 designates TIFF as the file format. This is because a reading process is instructed to the network apparatus 10 with respect to every single page even in a case of reading plural documents with the ADF and the reading process is repeated as long as there is a document placed in the ADF. Furthermore, XML is used as the data format in a case where error occurs. This is because data of XML format is easier to process compared to data of HTML format.

When the Web UI 202 receives the request from the network service 223, the network apparatus 10, based on the content of the request, comprehends that i) the button depressed in the control screen 130 is the preview execution button 1309 or the reading execution button 1310 and ii) reading conditions designated by the user (e.g., resolution, density, document type, reading size) and the file format implicitly designated by the TWAIN driver 151 are the parameters for obtaining the image resource. Then, in Step S1518, the Web UI 202 sends an instruction "reading instruction from remote" along with parameters for obtaining the image resource to the scanner application 214.

Then, in Steps S1519 and S1520, the scanner application 214, receiving the instruction from the Web UI 202, instructs the document reading apparatus 104 to perform reading via the reading service 222. Then, in Step S1521, the document reading apparatus 104 reads image data from a document, compresses the read image data, and stores the image data in an image memory managed by the memory service 224. After the document reading apparatus 104 completes the reading process, the compressing process, and the storing process, the operation proceeds to Step S1522. In Step S1522, the document reading apparatus 104 reports to the reading service 222 that image data have been stored in the image memory.

Then, in Step S1523, the reading service 222, receiving the report of S1522, reports that the reading process for the first page of the document is completed to the scanner application 214. Then, in Step S1524, the scanner application 214 reports completion of the reading process to the Web UI 202.

Even if an unread document(s) is still remaining in the ADF, the completion of the reading process is reported in a state where the unread document(s) is left remaining in the ADF. This is due to the TWAIN driver 151 instructing that a single page be read (by using JPEG or single page TIFF).

Then, in Step S1525, the Web UI 202, receiving the report of completion from the scanner application 214, reads out the image data stored in the image memory by the document reading apparatus 104. Then, in Step S1526, the Web UI 202 requests the network service 223 to transmit the image data to the Web browser 60 of the user. Then, in Step S1527, the network service 223 transmits the image data to the Web browser 60 of the user.

When the transmission of the image data is completed, the operation proceeds to Step S1528. In Step S1528, the network service 223 reports completion of transmission to the Web UI 202. Then, in Step S1529, the Web UI 202 instructs the memory service 224 to discard the image data transmitted in Step S1527 upon receiving the transmission completion report from the network service 223.

Then, in Step S1530, the TWAIN driver 151, upon receiving the image data, transfers the image data to the application software 150. Since the format of the image data from the network apparatus 10 is either JPEG format or TIFF format, the application software 150 cannot recognize such format of the image data. Therefore, before transferring the image data to the network apparatus 10, the image data are converted into a format that can be recognized by the application software 150.

Then, in order to determine whether an unread document(s) is remaining in the ADF, the TWAIN driver 151 issues (sends) a request again for obtaining a "reading apparatus state" resource of the document reading apparatus 104 to the network apparatus 10. In the same manner described above in Steps S1511-S1515, various data are obtained. In a case where the TWAIN driver 151 receives data indicating that an unread document(s) is remaining in the ADF, the TWAIN driver obtains image data of the remaining document by issuing (sends) a request to obtain the image resource in the same manner described in Steps S1516-S1530. In a case where no unread document is remaining in the ADF (i.e. reading of all documents completed), the TWAIN driver 151 completes the operation and returns control to the application software.

Figure 17:
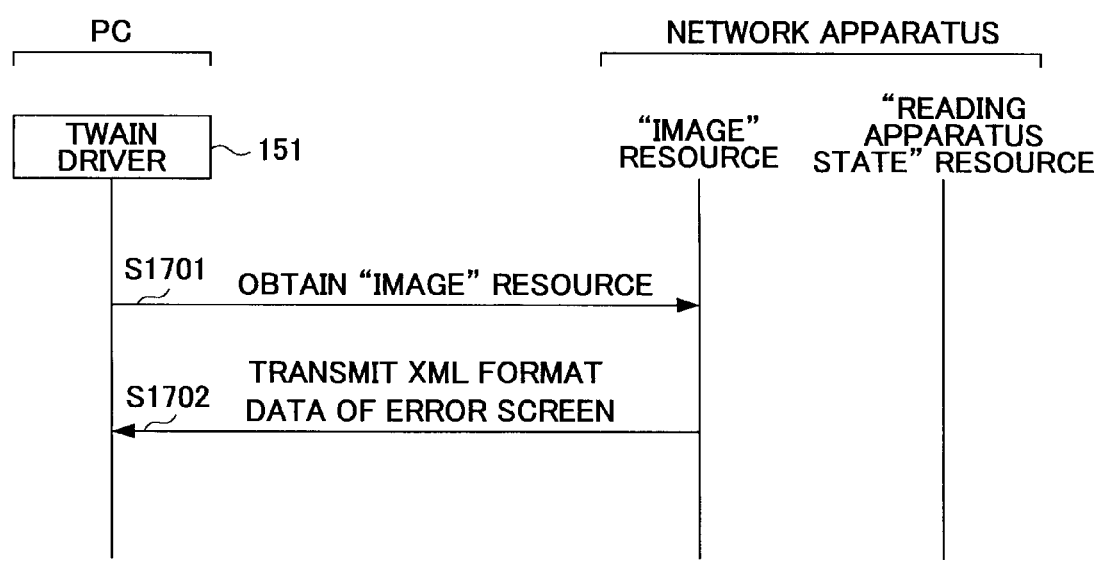
FIG. 17 is a sequence diagram showing an example of an operation for displaying an error screen on a Web browser manipulated by the user in a case where reading cannot be executed with a combination of reading conditions (parameters) designated by the user according to an embodiment of the present invention.

FIG. 17 is a sequence diagram showing an example of an operation for displaying an error screen 190 on a Web browser manipulated by the user in a case where reading cannot be executed with a combination of reading conditions (parameters) designated by the user.

For example, an error may occur for a low-cost network apparatus 10 having a small work memory 102 when the user designates reading a large size document with a high resolution. In this case, it is necessary to report this error to the user.

In Step S1701, when the user depresses the reading execution button 1310 in a case where 1200 dpi is set in the resolution setting selection box 1302 and A4 is set in the reading size setting selection box 1305, the TWAIN driver 151 sends a request to obtain an image resource to the network apparatus 10.

Figures 18, 19:
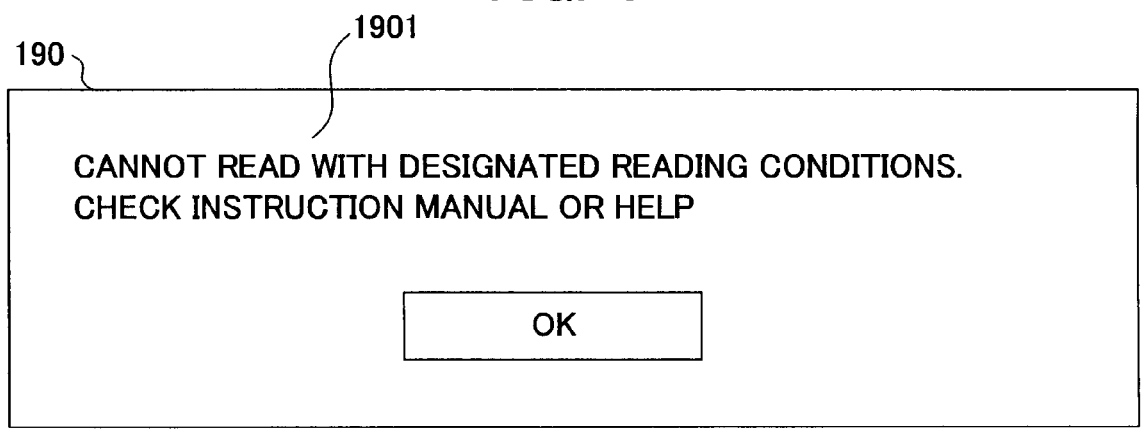
FIG. 18 is a schematic diagram showing an example of XML data of an error screen according to an embodiment of the present invention.
FIG. 19 shows an example of a pop-up dialog screen indicating an error according to an embodiment of the present invention.

Then, in Step S1702, the network apparatus 10 confirms each parameter of the reading conditions. In this example, due to the constraint of the work memory 102, a document cannot be read with a size of A4 and a resolution of 1200 dpi. Therefore, in this step, the network apparatus 10 transmits XML data of an error screen 190 (see FIGS. 18 and 19) to the TWAIN driver 151 instead of transmitting image data of a read document. FIG. 18 is a schematic diagram showing an example of the XML data of the error screen 190. The TWAIN driver 151, receiving the XML data, analyzes the content of the received XML. In this case, the TWAIN driver 151 analyzes that the error is due to the user having designated reading conditions that cannot be used in combination for performing the reading process. Accordingly, the TWAIN driver 151 displays a pop-up dialog window (error screen) 190 as shown in FIG. 19. FIG. 19 shows an example of the pop-up dialog screen 190 indicating the error.

Figure 20:
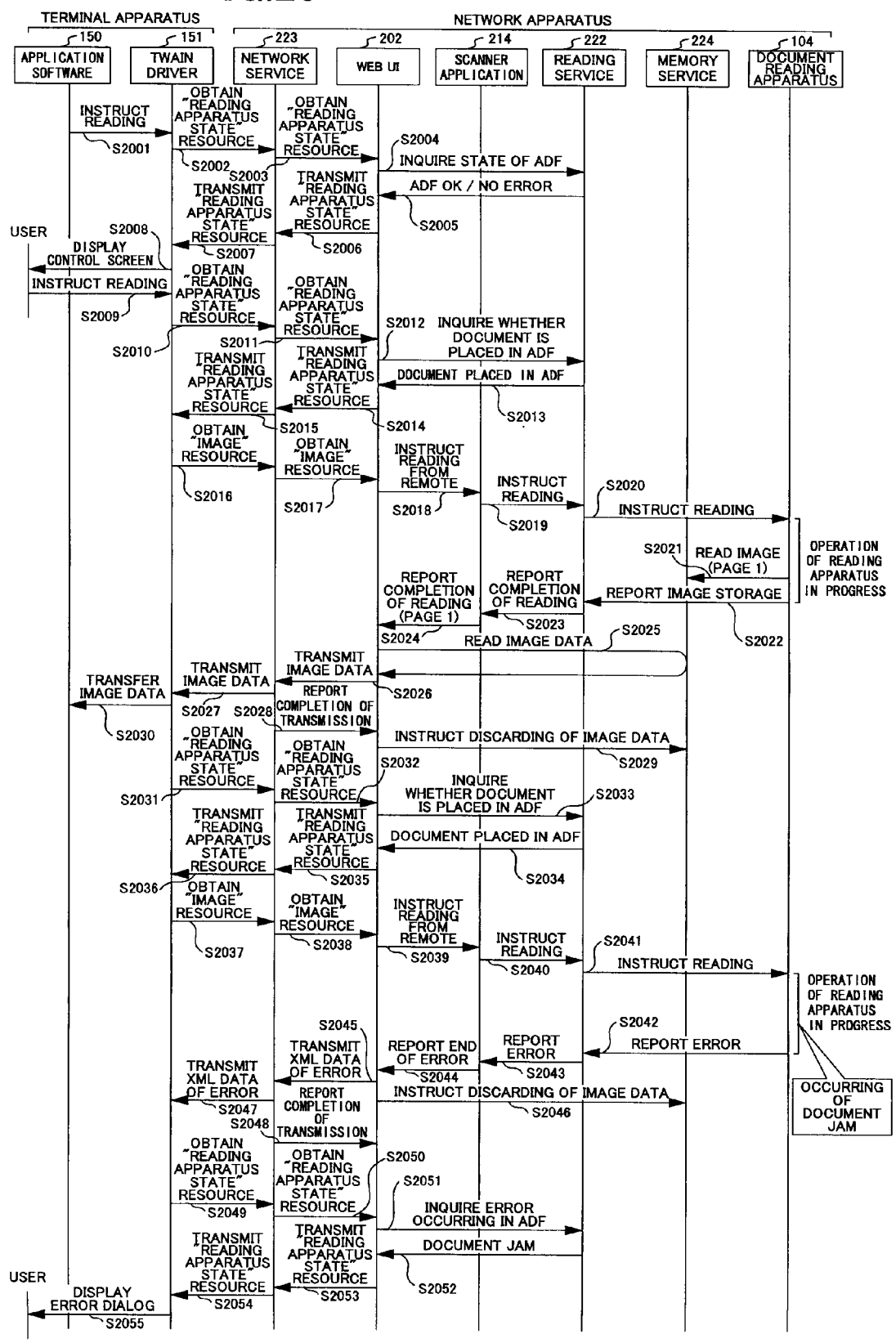
FIG. 20 is a sequence diagram showing an example of an operation in a case where an error occurs during a reading process with an application software of a terminal apparatus using a TWAIN driver according to an embodiment of the present invention.

FIG. 20 is a sequence diagram showing an example of an operation in a case where an error occurs during a reading process with an application software of a terminal apparatus using a TWAIN driver. Except for a portion of the sequence diagram of FIG. 20, the sequence diagram of FIG. 20 is substantially the same as the sequence diagram of FIG. 15. Thus, descriptions of same steps are omitted.

In FIG. 20, the processes performed in Steps S2001-S2030 are substantially the same as those performed in Steps S1501-S1530 of FIG. 15. That is, the user depresses the preview execution button 1309 or the reading execution button 1310 of the control screen 130 of the TWAIN driver 151.

Then, the TWAIN driver 151 issues (sends) a request to obtain the image resource to the document reading apparatus 104. The network service 223 in the network apparatus 10 accepts (receives) the request issued from the TWAIN driver 151. Then, the network service 223 distributes the request received from the TWAIN driver to the Web UI 202. That is, the network service 223 delivers the received request as is to the Web UI 202. Then, the Web UI 202 sends an instruction "reading instruction from remote" to the scanner application 214.

Then, the scanner application 214, receiving the instruction from the Web UI 202, instructs the document reading apparatus 104 to perform reading via the reading service 222. Then, the document reading apparatus 104 reads image data from a document, compresses the read image data, and stores the image data in an image memory managed by the memory service 224. After the document reading apparatus 104 completes the reading process, the compressing process, and the storing process, the document reading apparatus 104 reports to the reading service 222 that image data have been stored in the image memory.

Then, the reading service 222, receiving the report from the document reading apparatus 104, reports that the reading process for the first page of the document is completed to the scanner application 214. Then, the scanner application 214 reports completion of the reading process to the Web UI 202.

Then, the Web UI 202, receiving the report of completion from the scanner application 214, reads out the image data stored in the image memory by the document reading apparatus 104. Then, the Web UI 202 requests the network service 223 to transmit the image data to the TWAIN driver 151. Then, the network service 223 transmits the image data to the TWAIN driver 151.

When the transmission of the image data is completed, the network service 223 reports completion of transmission to the Web UI 202. Then, the Web UI 202 instructs the memory service 224 to discard the image data transmitted in S2027 upon receiving the transmission completion report from the network service 223.

Then, the TWAIN driver 151, upon receiving the image data, transfers the image data to the application software 150. Since the format of the image data from the network apparatus 10 is either JPEG format or TIFF format, the application software 150 cannot recognize such format of the image data. Therefore, before transferring the image data to the network apparatus 10, the image data is converted into a format that can be recognized by the application software 150.

Furthermore, in FIG. 20, the processes performed in Steps S2031-S2041 are substantially the same as those performed in Steps S2010-S2020. That is, when the TWAIN driver 151 confirms that a next document (next page) is placed in the document reading apparatus 104 by obtaining the "reading apparatus state" resource of the document reading apparatus 104, the TWAIN driver 151 instructs the document reading apparatus 104 to read the next document via the reading service 222.

When document jam (error) occurs in the ADF in the middle of reading the second page of the document (next document), the document reading apparatus 104 reports the error to the scanner application through the reading service 222. Then, the scanner application 214 reports to the Web UI 202 that the reading process has ended in error.

Then, the Web UI 202, receiving the error end report, instructs the document reading apparatus 104 to discard the image data stored in the image memory. Then, the Web UI 202 requests the network service 223 to transmit XML data indicative of the error (see FIG. 21) to the TWAIN driver 151.

Figures 21, 22:
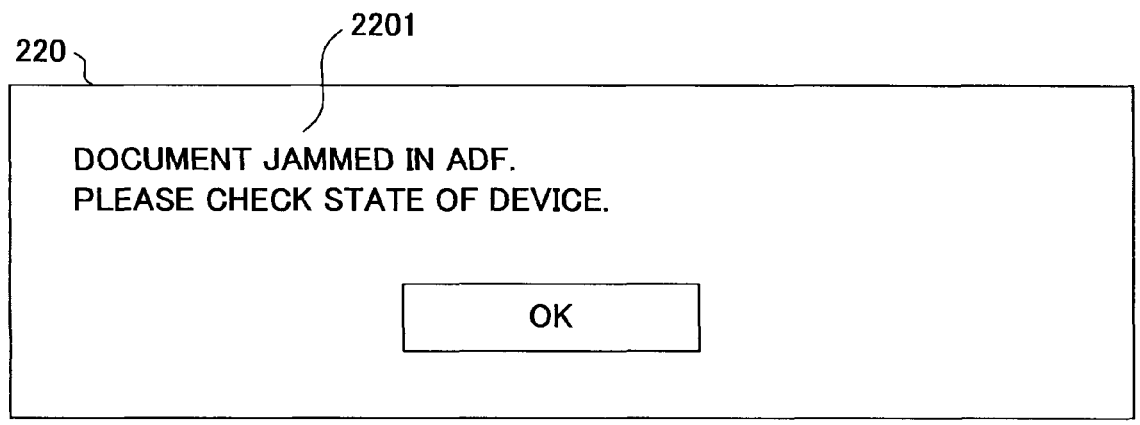
FIG. 21 is a schematic diagram showing an example of XML data indicating an error according to an embodiment of the present invention.
FIG. 22 shows an example of a pop-up dialog screen indicating an error according to an embodiment of the present invention.

FIG. 21 is a schematic diagram showing an example of the XML data indicating the error.

Then, the TWAIN driver 151, receiving the XML data, analyzes the content of the received data. Since the cause of the error occurred in the middle of executing the reading progress, the TWAIN driver 151 obtains the "reading apparatus state" of the document reading apparatus 104. In this example, since the type of error that occurred in the ADF is "document jam", the error is displayed in a pop-up dialog window 220 as shown in FIG. 22.

In the sequence diagram of FIG. 20, the image data of the first page of the document, which is read without error, are already transferred to the application software 150. However, since the second page of the document could not be read due to the error, the error is reported to the application software 150. Alternatively, the error may be ignored and control can be returned to the application software 15.

With the above-described embodiment of the present invention, a single easy-to-use interface is used to execute image reading with the WEB browser 60 or image reading with the TWAIN driver 151 without requiring different protocols or interfaces in the network apparatus 10 (network apparatus side).

Furthermore, since a single easy-to-use interface is used instead of preparing different protocols or plural interfaces in the network apparatus 10, processes of designing or implementing different protocols and plural interfaces can be eliminated.

Furthermore, in addition to being able to easily design and implement a Web service for remotely reading a document, the Web service can be realized with a small ROM/RAM. Furthermore, a designer of a Web page, a designer of the TWAIN driver 151, or a system integrator of a system outside of a company can easily develop software for reading remotely reading images.

The present invention provides a single interface which not only can be easily operated with a Web browser 60 but can also provide advanced functions required by the TWAIN driver 151. Although a Web service using SOAP requires a large ROM or RAM for managing sessions and states (statuses), the interface of the present invention can be easily designed and implemented without requiring such large ROM or RAM.

Hence, the network apparatus, the terminal apparatus, the program, and the recording medium according to the above-described embodiments of the present invention provide an advanced interface of a network apparatus which can be easily used from outside via a network and easily designed and implemented for remotely performing reading images even where one or more terminal apparatus instructing the reading of the images use various software.

Further, the present invention is not limited to these embodiments, but variations and modifications may be made without departing from the scope of the present invention.

The present application is based on Japanese Priority Application No. 2006-191986 filed on Jul. 12, 2006, with the Japanese Patent Office, the entire contents of which are hereby incorporated by reference.

What is claimed is:

1. A network apparatus connected to at least one terminal apparatus via a network, the network apparatus comprising:
   hardware unique to the network apparatus and internal to the network apparatus;
   an interface configured to communicate with the terminal apparatus by using the same protocol as the terminal apparatus; and
   a document reader, wherein the interface is configured to receive an operation instruction to operate the hardware unique to the network apparatus, the operation instruction being issued by one of various types of software executed in the terminal apparatus and to instruct the hardware to operate in accordance with the received operation instruction, to receive a read instruction to operate the document reader, the read instruction to operate the document reader being issued by one of the various types of software executed in the terminal apparatus, to instruct the document reader to read a document in accordance with the received read instruction, to receive a state obtaining instruction to obtain a state of the document reader, the state obtaining instruction to obtain the state being issued by one of the various types of software executed in the terminal apparatus, to obtain the state of the document reader in accordance with the received state obtaining instruction, and to report the state of the document reader in response to the received state obtaining instruction, wherein the terminal apparatus is provided separately from the hardware, and wherein the interface is configured to communicate with the terminal apparatus using a REST (Representational State Transfer) architecture to control data using only an obtaining method defined by HTTP (Hypertext Transfer Protocol).

2. The network apparatus as claimed in claim 1, wherein the interface is configured to receive the operation instruction from at least one of a Web browser and a device driver executed in the terminal apparatus.

3. The network apparatus as claimed in claim 2, wherein the device driver includes a TWAIN (Tool Without An Interesting Name) driver.

4. The network apparatus as claimed in claim 1, wherein the interface is configured to report a result of the operation of the hardware by using a data format corresponding to the one of the various types of software executed in the terminal apparatus.

5. The network apparatus as claimed in claim 1, wherein the interface is configured to receive a parameter obtaining instruction to obtain a parameter of a reading condition of the document reader, the parameter obtaining instruction to obtain the parameter being issued by one of the various types of software executed in the terminal apparatus, to obtain the parameter in accordance with the received parameter obtaining instruction, and to report the parameter in response to the received parameter obtaining instruction.

6. The network apparatus as claimed in claim 5, wherein the interface is configured to report an error of the document reader by using a data format corresponding to a type of software being executed in the terminal apparatus in a case where the read instruction to operate the document reader includes a combination of parameters that cannot be executed by the document reader.

7. The network apparatus as claimed in claim 1, wherein the interface is configured to report an error of the document reader by using a data format corresponding to a type of software being executed in the terminal apparatus.

8. The network apparatus as claimed in claim 7, wherein the interface is configured to report an error of the document reader by using an HTML (Hypertext Markup Language) format in a case where the type of software being executed is a Web browser.

9. The network apparatus as claimed in claim 7, wherein the interface is configured to report an error of the document reader by using an XML (Extensible Markup Language) format in a case where the software is a TWAIN driver.

10. The network apparatus as claimed in claim 1, wherein the interface is configured to report an error of the document reader by using a data format corresponding to a type of software being executed in the terminal apparatus in a case where the document reader is unable to read the document.

11. The network apparatus as claimed in claim 1, wherein the hardware unique to the network apparatus includes at least one of: a document reading apparatus and a printing apparatus.

12. A non-transitory computer readable storage medium storing a program, which when executed by a network apparatus that is connected to a terminal apparatus via a network, causes the network apparatus to perform a method comprising:

communicating, via an interface of the network apparatus, with the terminal apparatus by using the same protocol as the terminal apparatus, receiving, by the interface, an operation instruction to operate hardware unique to the network apparatus and internal to the network apparatus, the operation instruction being issued by one of various types of software executed in the terminal apparatus;

operating the hardware unique to the network apparatus in accordance with the received operation instruction;

receiving a read instruction to operate a document reader, the read instruction to operate the document reader being issued by one of the various types of software executed in the terminal apparatus;

reading, by the document reader, a document in accordance with the received read instruction;

receiving a state obtaining instruction to obtain a state of the document reader, the state obtaining instruction to obtain the state being issued by one of the various types of software executed in the terminal apparatus;

obtaining, by the document reader, the state of the document reader in accordance with the received state obtaining instruction;

reporting the state of the document reader in response to the received state obtaining instruction; and communicating, via the interface, with the terminal apparatus using a REST (Representational State Transfer) architecture to control data using only an obtaining method defined by HTTP (Hypertext Transfer Protocol), wherein the terminal apparatus is provided separately from the hardware.

13. The non-transitory computer readable storage medium as claimed in claim 12, wherein the interface receives the operation instruction from at least one of a Web browser and a device driver executed in the terminal apparatus.

14. A method of controlling a network apparatus that is connected to a terminal apparatus via a network, comprising:

communicating, via an interface of the network apparatus, with the terminal apparatus by using the same protocol as the terminal apparatus;

receiving, by the interface, an operation instruction to operate hardware unique to the network apparatus and internal to the network apparatus, the operation instruction being issued by one of various types of software executed in the terminal apparatus;

operating the hardware unique to the network apparatus in accordance with the received operation instruction;

receiving a read instruction to operate a document reader, the read instruction to operate the document reader being issued by one of the various types of software executed in the terminal apparatus;

reading, by the document reader, a document in accordance with the received read instruction;

receiving a state obtaining instruction to obtain a state of the document reader, the state obtaining instruction to obtain the state being issued by one of the various types of software executed in the terminal apparatus;

obtaining, by the document reader, the state of the document reader in accordance with the received state obtaining instruction;

reporting the state of the document reader in response to the received state obtaining instruction; and communicating, via the interface, with the terminal apparatus using a REST (Representational State Transfer) architecture to control data using only an obtaining method defined by HTTP (Hypertext Transfer Protocol), wherein the terminal apparatus is provided separately from the hardware.

* * * * *